(12) United States Patent
Shuttleworth

(10) Patent No.: US 10,083,581 B2
(45) Date of Patent: Sep. 25, 2018

(54) SECURITY SYSTEMS FOR CONTAINERS

(71) Applicant: Timothy G. Shuttleworth, Girard, PA (US)

(72) Inventor: Timothy G. Shuttleworth, Girard, PA (US)

( * ) Notice: Subject to any disclaimer, the term of this patent is extended or adjusted under 35 U.S.C. 154(b) by 0 days.

(21) Appl. No.: 15/591,351

(22) Filed: May 10, 2017

(65) Prior Publication Data

US 2018/0005498 A1    Jan. 4, 2018

Related U.S. Application Data

(62) Division of application No. 14/679,382, filed on Apr. 6, 2015, now Pat. No. 9,679,450.

(60) Provisional application No. 61/975,317, filed on Apr. 4, 2014.

(51) Int. Cl.

| | |
|---|---|
| *G08B 23/00* | (2006.01) |
| *G08B 13/08* | (2006.01) |
| *E05B 65/00* | (2006.01) |
| *G08B 25/00* | (2006.01) |
| *E05B 65/44* | (2006.01) |
| *F16B 1/00* | (2006.01) |

(52) U.S. Cl.
CPC .......... *G08B 13/08* (2013.01); *E05B 65/0075* (2013.01); *E05B 65/44* (2013.01); *G08B 25/00* (2013.01); *F16B 2001/0035* (2013.01)

(58) Field of Classification Search
CPC ..... G08B 13/08; G08B 25/00; E05B 65/0075; E05B 65/44; F16B 2001/0035

USPC ...................................................... 340/693.1
See application file for complete search history.

(56) References Cited

U.S. PATENT DOCUMENTS

| | | | | |
|---|---|---|---|---|
| 5,489,890 A | * | 2/1996 | Moser | G08B 13/08 |
| | | | | 200/61.93 |
| 6,278,367 B1 | * | 8/2001 | Baglin | G08B 13/08 |
| | | | | 340/545.1 |
| 6,921,990 B1 | * | 7/2005 | Higgins | G08B 13/08 |
| | | | | 109/38 |
| 8,461,989 B2 | * | 6/2013 | Romero | G01S 13/04 |
| | | | | 340/426.1 |
| 9,349,113 B2 | * | 5/2016 | Bashkin | G06Q 10/087 |
| 9,679,450 B2 | * | 6/2017 | Shuttleworth | G08B 13/08 |
| 2007/0194916 A1 | * | 8/2007 | Hewitt | G08B 13/08 |
| | | | | 340/545.6 |
| 2012/0075139 A1 | * | 3/2012 | Gagnon | G01S 5/0027 |
| | | | | 342/357.29 |

(Continued)

*Primary Examiner* — John A Tweel, Jr.
(74) *Attorney, Agent, or Firm* — K&L Gates LLP

(57) ABSTRACT

Security systems and methods are disclosed. A security system can be employed with a mobile, unpowered container having a door movable between an open orientation and a closed orientation. The security system can include an enclosure and a switch movable between a closed configuration and an open configuration upon movement of the door between the open orientation and the closed orientation. The security system can further include a battery pack in communication with the switch. The security system can also include a security device. The battery pack can be configured to operably power the security device when the switch is in the closed configuration. The security system can be attached to the container with a magnet and/or an array of magnets enclosed in a flexible magnetic mat. The security system can be deployed for a plurality of deployment cycles.

12 Claims, 25 Drawing Sheets

(56) References Cited

U.S. PATENT DOCUMENTS

2013/0016636 A1\* 1/2013 Berger .................. G06Q 10/08
370/310

\* cited by examiner

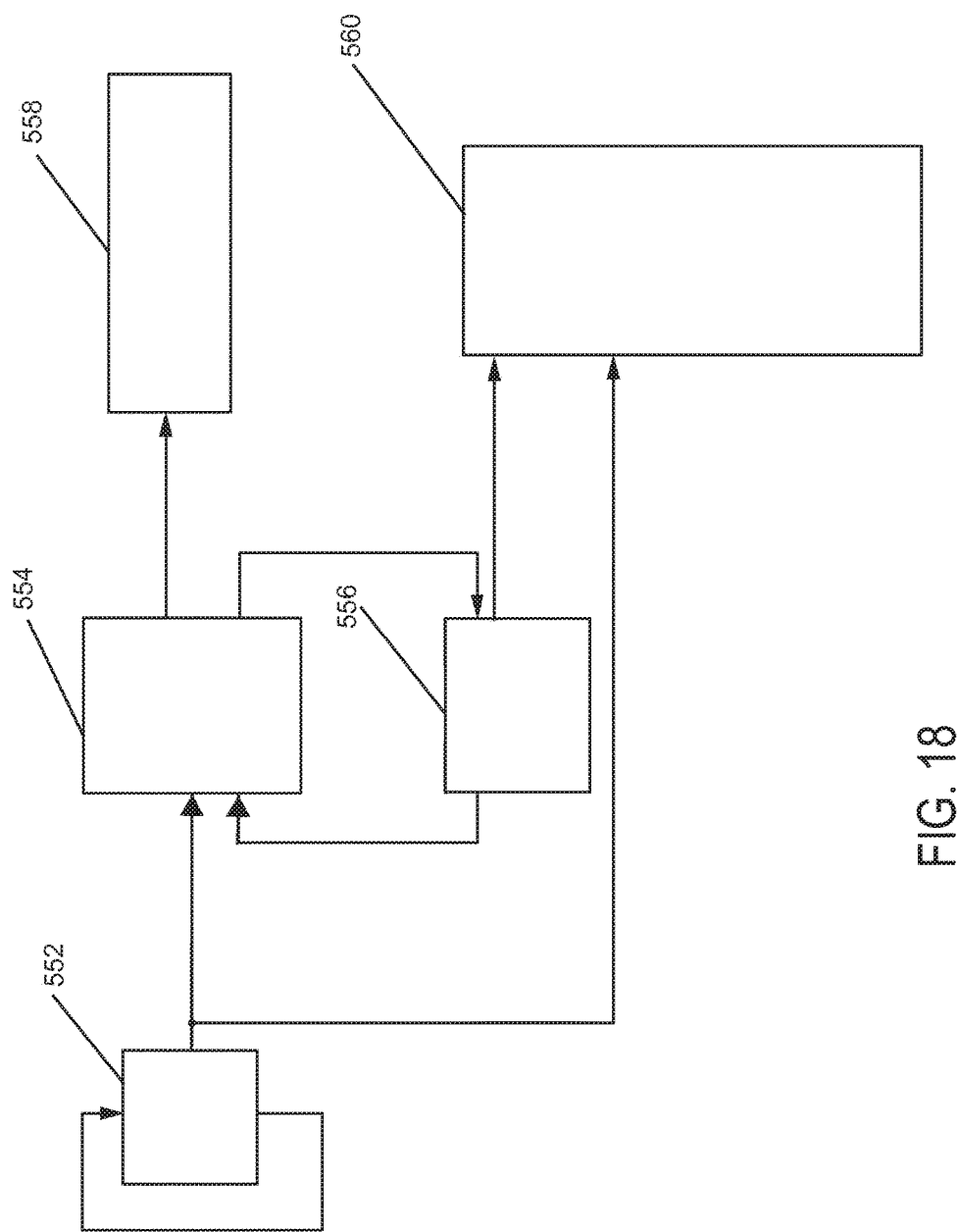

SECURITY SYSTEMS FOR CONTAINERS

CROSS-REFERENCE TO RELATED APPLICATION

This application is a divisional application claiming priority under 35 U.S.C. § 121 to U.S. patent application Ser. No. 14/679,382, entitled SECURITY SYSTEMS FOR CONTAINERS, filed Apr. 6, 2015, now U.S. Patent Application Publication No. 2015/0287308, which claims the benefit under 35 U.S.C. § 119(e) of U.S. Provisional Patent Application No. 61/975,317, entitled SECURITY SYSTEM FOR SHIPPING CONTAINERS AND METHOD FOR USING AND ASSEMBLING THE SAME, filed Apr. 4, 2014, which is incorporated by reference herein in its entirety.

FIELD OF THE INVENTION

The present disclosure relates to security systems for containers and methods for using the same.

BACKGROUND

A security system can monitor goods placed in storage and/or in transit, for example. Such a security system can deter, prevent, and/or monitor vandalism, theft or attempted theft of the goods. Goods are often stored in remote and/or poorly secured locations. Additionally or alternatively, goods can be transferred through remote and/or poorly secured locations. Such goods may be in transit and/or storage for extended periods of time, such as weeks, months, and even years at a time.

The foregoing discussion is intended only to illustrate various aspects of the related art in the field of the invention at the time, and should not be taken as a disavowal of claim scope.

SUMMARY

In a general aspect, a security system for a mobile, unpowered container includes an enclosure having an attachment portion, a security device positioned within the enclosure, and a battery positioned within the enclosure, wherein the battery is configured to operably power the security device. The security system further includes a magnet removably positionable intermediate the attachment portion of the enclosure and the container, wherein the magnet generates a magnetic field that attracts the enclosure to the container when the magnet is positioned intermediate the attachment portion and the container.

In at least one form, the security system further includes a magnetic mat comprising the magnet, wherein the magnetic mat is removably positionable intermediate the attachment portion of the enclosure and the container, and wherein the magnetic mat includes a flexible quilt defining an array of receptacles and an array of permanent magnets positioned within the receptacles.

In another general aspect, a security system for a mobile, unpowered container having a door movable between an open orientation and a closed orientation includes an enclosure and a switch positioned within the enclosure, wherein the switch is movable between a closed configuration and an open configuration upon movement of the door between the open orientation and the closed orientation. The security system further includes a battery pack positioned within the enclosure, wherein the battery pack is in communication with the switch. The security system further includes a security device positioned within the enclosure, wherein the security device includes an alarm and a recording device, wherein the battery pack is configured to operably power the security device when the switch is in the closed configuration.

In at least one form, the security system further includes a trigger line extending between the door and switch in the enclosure. In another form, the switch includes a reed switch configured to detect a change in magnetic field when the door of the container is moved between the open orientation and the closed orientation.

In another general aspect, a method includes providing a security system for a deployment, wherein the deployment includes monitoring a mobile, unpowered container, and wherein the security system includes an enclosure and a battery pack for powering the security system, wherein the battery pack is positioned within the enclosure. The method further includes receiving the security system after the deployment.

In at least one form, the deployment is a first deployment and the mobile, unpowered container is a first mobile, unpowered container, and the method further includes providing a security system for a subsequent deployment, wherein the subsequent deployment includes monitoring a second mobile, unpowered container and receiving the security system after the subsequent deployment.

In at least one form, using the security system includes providing instructions for attaching the security system to an inside surface of the first mobile, unpowered container without modifying the security system or the container and providing instructions for detaching the security system from the inside surface of the first mobile, unpowered container without modifying the security system or the container.

The foregoing discussion illustrates various embodiments of the present disclosure, in at least one form, and such exemplifications are not to be construed as limiting the scope of the claims in any manner. For example, the features illustrated or described in connection with one exemplary embodiment may be combined with the features of at least one other embodiment. Such modifications and variations are intended to be included within the scope of the present disclosure.

BRIEF DESCRIPTION OF THE DRAWINGS

Various features of the embodiments described herein are set forth with particularity in the appended claims. The various embodiments, however, both as to organization and methods of operation, together with advantages thereof, may be understood in accordance with the following description taken in conjunction with the accompanying drawings:

FIG. 18 is a logic diagram for a security system, according to various embodiments of the present disclosure.

Figure 1:
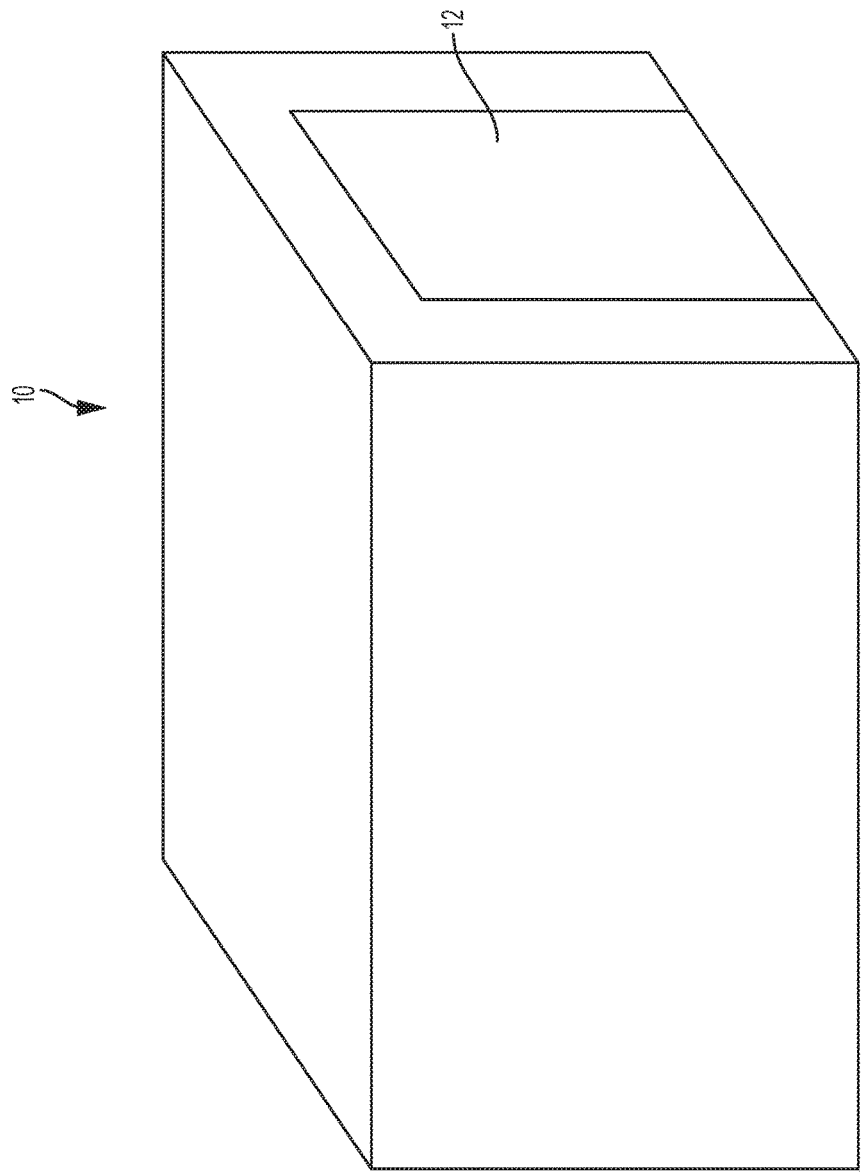
FIG. 1 is a perspective view of a container having a door, according to various embodiments of the present disclosure.

The exemplifications set out herein illustrate various embodiments of the present disclosure, in at least one form, and such exemplifications are not to be construed as limiting the scope of the claims in any manner. For example, the features illustrated or described in connection with one exemplary embodiment may be combined with the features of at least one other embodiment. Such modifications and variations are intended to be included within the scope of the present disclosure.

DETAILED DESCRIPTION

In various instances, goods placed in storage and/or in transit can be susceptible to theft. For example, goods held in shipping containers can be susceptible to theft during transit of the containers, and goods held in storage containers can be susceptible to theft during a storage period. Such containers include shipping containers that are shipped by train, boat, airplane, and/or motor vehicle, such as export cargo containers for overseas freight, for example. Such containers also include storage containers at construction, mining, and/or drilling sites (e.g., trailers), self-storage containers for household goods, and/or commercial storage containers for commercial goods, for example. Such containers can be mobile. For example, the containers can be transported and/or relocated. Additionally, such containers can be unpowered. For example, the containers may not include an internal power supply and may not be wired for connection to an external power supply. Additionally or alternatively, an external power supply by not be available, reliable, and/or sufficient. In certain instances, telephone lines may also be unavailable and/or such containers may not be configured for connection to the telephone lines.

During transit and/or a storage period, the containers can be located at unsecured and/or poorly secured locations. For example, a shipping container can pass through multiple facilities along a transit route, such as one or more seaport(s), intermodal transfer location(s), freight marshaling yard(s), warehouse(s), vessel(s) and/or other junctures between a loading point and an unloading point. The facilities may be unsecured and/or poorly secured. Additionally, shipping containers can pass through the control of multiple shippers and/or jurisdictions between the loading point and the unloading point. Moreover, certain local law enforcement personnel may permit and/or accept theft from the containers in some jurisdictions and/or at some facilities. Containers can also be placed in remote and/or poorly secured locations, which may be unattended and/or unsupervised for periods of time, such as unattended and/or abandoned lots and/or empty fields, for example. Remote locations often lack access, or at least reliable access, to a power supply and/or communication lines. For example, the locations can be outside of the power grid and/or may not be serviced by telephone lines.

To deter, prevent, and/or monitor theft from such containers, a security system can be employed within the container. The security system can be self-sufficient and self-powered. In other words, the security system for the container need not rely on a power grid or external power supply, such as solar panels and/or external batteries, for example. The power supply for the security system can be entirely internal to and/or self-contained within the container and within the security system. For example, the power supply can include a battery pack of one or more batteries within a secure enclosure of the security system, and a trigger system of the security system can selectively couple one or more of the batteries to the components of the security system. As described herein, such a trigger system can include a trigger line, a motion sensor, and/or a magnetic switch, for example. Because the power supply (e.g., battery pack) for the security system is entirely internal to the security system, the security system can have access to power when the container is being shipped and/or when the container is placed in a remote location. Moreover, internal placement of the power supply can prevent and/or thwart attempted tampering attempts by vandals, intruders, and/or thieves.

In various instances, the security system can be reusable and/or modular. Such a security system can be used for multiple deployments and with different containers. For example, the security system can be used with a first container during a first deployment, and can be used with a second container during a subsequent deployment. As described in greater detail herein, a deployment cycle is a period of use with a single container. The deployment cycle includes installing the security system within a container, monitoring the container with the security system for a duration of time, and uninstalling the security system from the container. In various instances, the security system can be installed or mounted within the container without affecting permanent modifications to the container or to the security system. Furthermore, the security system can be uninstalled or removed from the container without affecting permanent modifications to the container or to the security system. As described in greater detail herein, at least one magnet can be utilized to temporarily secure the security system to the container.

Figure 2:
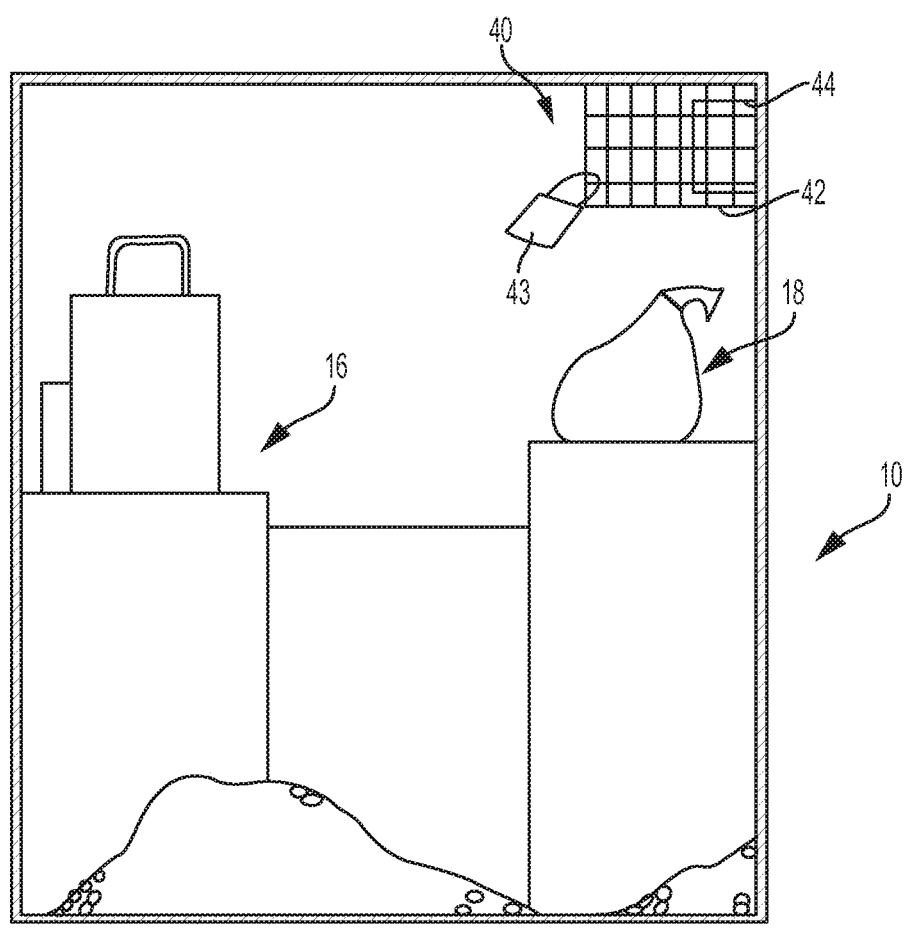
FIG. 2 is a cross-sectional elevation view of the container of FIG. 1 depicting a security system and goods within the container.
Figure 3:
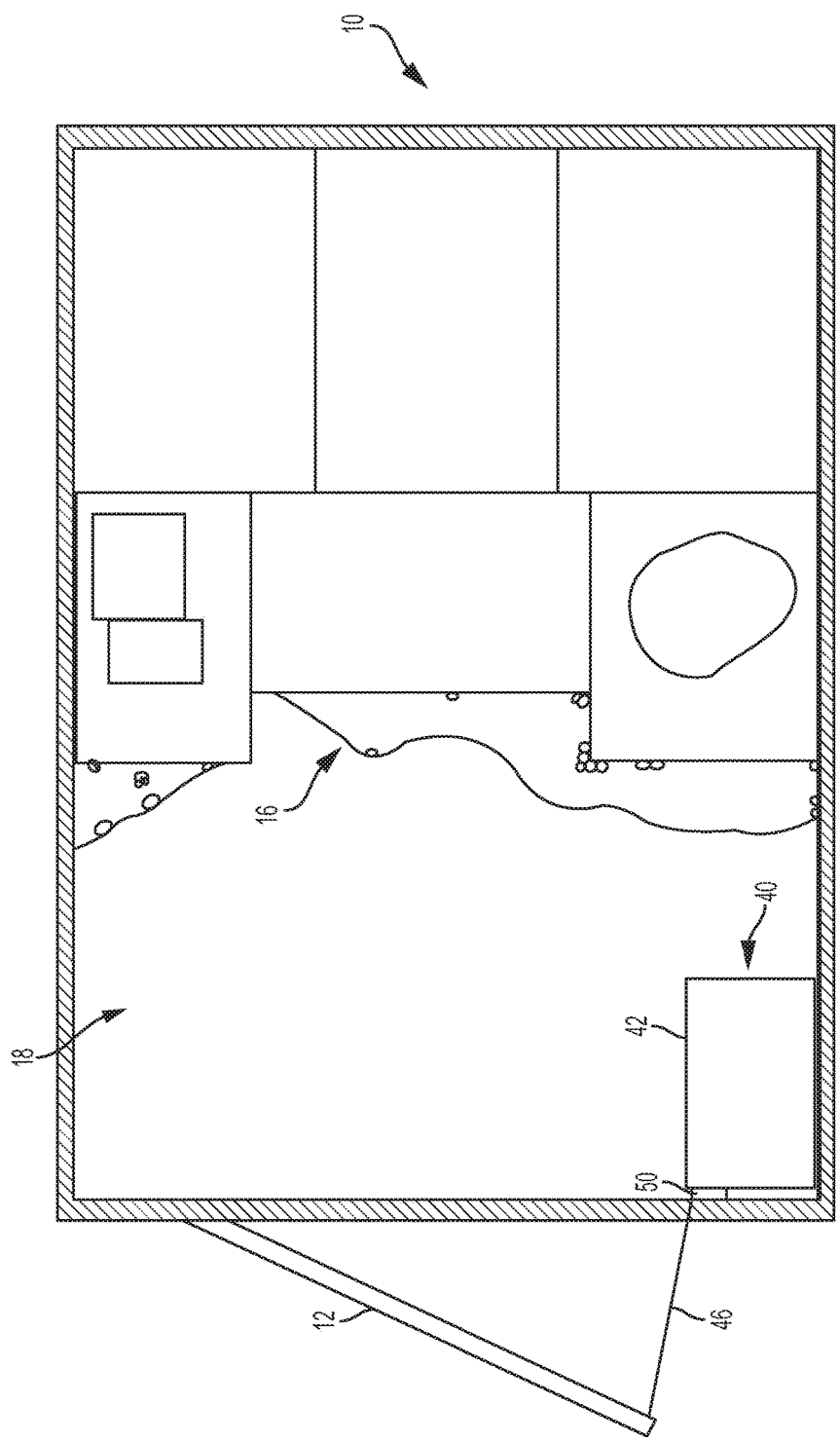
FIG. 3 is a cross-sectional plan view of the container of FIG. 1 depicting the door in an open configuration.

Referring to FIGS. 1-3, an exemplary container 10 is depicted. The container 10 is configured to transport, store and/or carry a variety of goods or cargo 16, such as various commodities, imports, and/or exports, for example. The container 10 is a six-sided container that forms a rectangular box and defines an interior cavity 18. The container 10 includes a door 12. The container 10 can be an industrial and/or commercial shipping container, intermodal freight container, trailer, semi-trailer, self-storage unit, rail box car, and/or commercial storage container, for example. The reader will appreciate that the various security systems described herein can be adapted for use with various suitable containers. For example, referring now to FIG. 5, various security systems described herein can also be used with an exemplary container 210, which includes double-doors 212a, 212b hinged on opposite sides of a sidewall of the container 210.

Referring again to FIGS. 1-3, a security system 40 (FIGS. 2 and 3) is positioned within the container 10. The security system 40 is positioned entirely within the interior cavity 18 of the container 10. The security system 40 includes an enclosure 42, which encapsulates or surrounds the components of the security system 40. For example, the enclosure 42 can hold various security devices, controllers, and batteries, as described in greater detail herein.

Referring primarily to FIG. 2, the enclosure 42 includes bars 44 and/or a lock 43 for preventing access to the interior components of the security system 40. The enclosure 42 may include additional metal bars, locks, and/or other structures and/or features for preventing access or at least delaying access to the internal components of the security system 40. Such features can prevent damage to the security system 40. Additionally or alternatively, the enclosure 42 can be secured within the container 10 at a location that is out of reach and/or not easily accessible to potential vandals, intruders, or thieves who gain access to the interior cavity 18 of the container 10. In certain instances, the housing or enclosure 42 can also be secured via an electrostatic defense, for example. Various attachment and/or mounting systems for the security system 40 are described in greater detail herein.

The security system 40, as well as the various other security systems described herein, can be configured to prevent, deter and/or monitor theft of cargo and/or goods from the container 10. In various instances, the security system 40 can be known and/or obvious to an occupant of the container 10, such as to a potential and/or attempted vandal and/or thief. For example, the security system 40 can provide notice to any intruders of the existence of the security system 40 and/or various surveillance and/or communication features of the security system 40. The security system 40 can provide notice to the intruder before and/or after the intruder has opened and/or breached the container 10, for example.

In various instances, the security system 40 can provide auditory and/or visual signs and/or signals to the intruder to notify the intruder of the security system 40 and/or of various surveillance and/or communication features thereof. In such instances, the security system 40 can thwart, or at least attempt to thwart, an in-process theft by providing notice to the intruder. The notice can include verbal warnings, for example, which can be pre-programmed recordings and/or can be delivered by a remote surveillance officer and/or law enforcement personnel and transmitted live to the container 10. A verbal warning could state that the intruder's actions are being observed and/or recorded and/or that the local police are being contacted, for example. In other instances, the auditory warning can comprise nonverbal sounds, such as beeps, honks, and/or sirens, for example. Auditory signals can be delivered to the intruder via a speaker within the enclosure 42 of the security system 40 and/or mounted elsewhere within the container 10. Additionally or alternatively, in certain instances, a monitor and/or screen can be positioned within the container 10, such as on the enclosure 42 of the security system 40, for providing visual signals and/or warnings to an intruder. In certain instances, visual signals such as a light can be provided. A light can be a flood light, flashing light, series of flashing lights, and/or a combination thereof, for example.

In some instances, the security system 40 can include a surveillance or recording device, which can collect evidence during an intrusion. For example, the security system 40 can capture still photographic images of the intruder, video and/or auditory recordings from the intrusion, and/or the date, time, and/or location, such as the GPS coordinates, for example, of the intrusion. Such evidence can be helpful to law enforcement and/or to support an insurance claim filing for the stolen and/or damaged property. This evidence can also alert the purported owner, supervisor, or manager of the goods and/or of the container that a theft is occurring, and can provide such an alert while the goods are still located on, or at least close to, the owner's, supervisor's or manager's property.

Optionally, the security system 40 can transmit the collected evidence to a different location to prevent tampering and/or on-site destruction or attempted destruction thereof. For example, the evidence transmission can be instantaneous and/or contemporaneous with the recording. In other instances, the transmission of the evidence can be delayed. For example, the transmission may be delayed until a wired and/or wireless and/or cellular connection is obtained. Additionally and/or alternatively, the security system 40 can store the collected evidence in the secure enclosure 42 within the container 10, for example. In certain instances, the collected evidence can be protected by a password and/or encrypted, for example. Additionally or alternatively, the security system 40 can be programmed to provide status updates to a remote monitoring location. For example, the system 40 can periodically send a signal to the remote monitoring location regarding the status of the system 40 include the battery life remaining, number of triggering events, and/or the duty cycle, which is described in greater detail herein. The system 40 can send the status updates when requested by the remote monitoring system, at regular intervals, and/or after extended periods without wireless and/or cellular connectivity, for example.

The reader will appreciate that the various security devices for surveillance and/or communication that are described above with respect to the security system 40 can be incorporated into various security systems disclosed herein.

Figure 4:
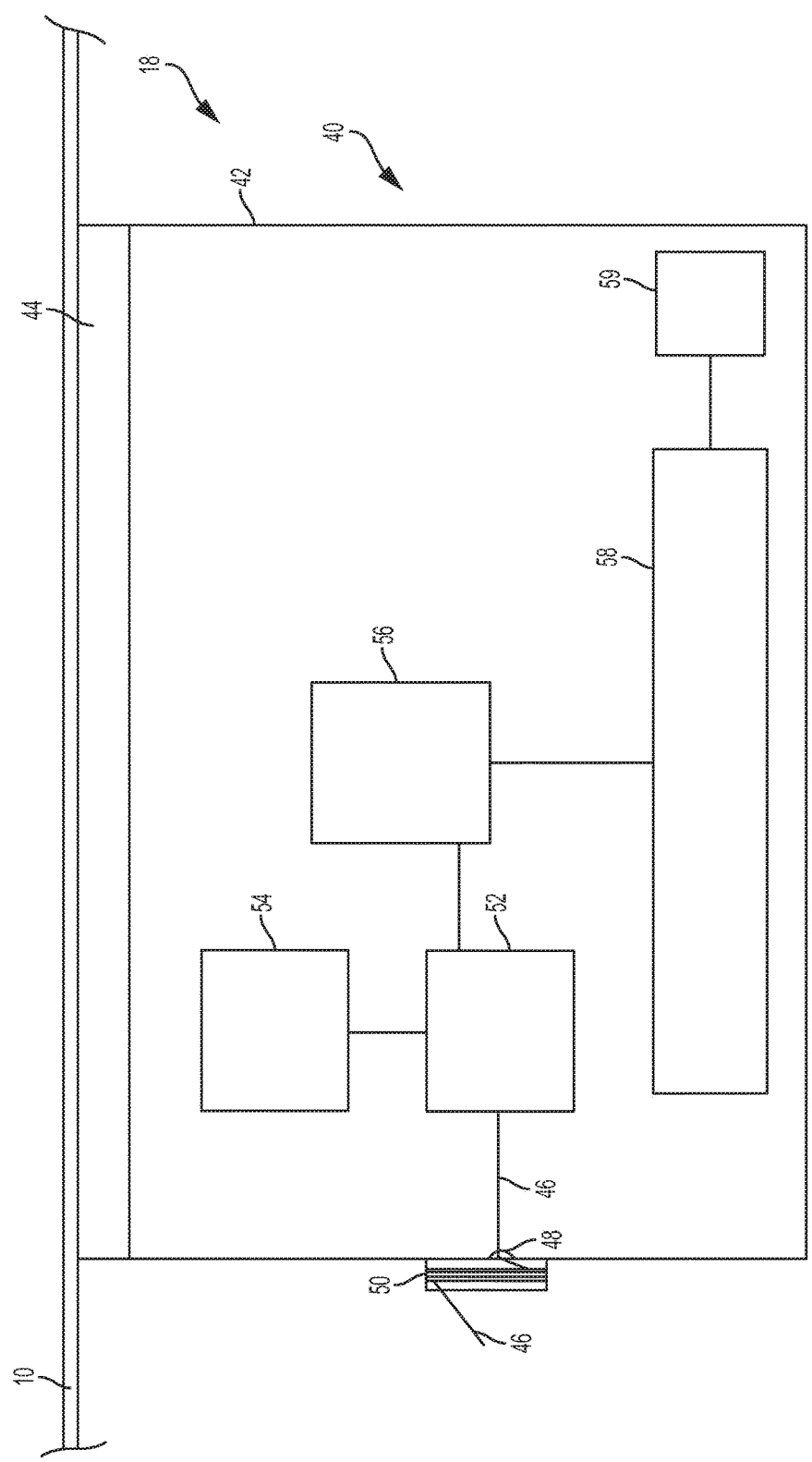
FIG. 4 is a schematic of a security system mounted to the container of FIG. 1, according to various embodiments of the present disclosure.

Referring primarily to FIG. 4, the security system 40 includes a switch system 52, a battery pack 54, a controller 56, and security equipment 58 housed within the secure enclosure 42. The security equipment 58 can include surveillance and/or communication devices, such as an alarm and/or a recording device, as well as additional surveillance and/or communication equipment described herein. The security system 40 shown in FIG. 4 also includes a display panel 59 in physical and/or signal communication with the security equipment 58. Though the display panel 59 is housed within the enclosure 42, the display panel 59 can be visible from outside of the enclosure 42. As a result, the display panel 59 can communicate information to occupants within the container 10. As described in greater detail herein, the security system 40 can include various additional features and/or components for monitoring, recording, and/or communication, as well as control systems for such features.

The battery pack 54 can include a single battery or a plurality of batteries. In various instances, the battery or batteries of the battery pack 54 can be rechargeable batteries, replaceable batteries, or a combination thereof. The batteries of the battery pack 54 can be recharged and/or replaced between deployment cycles. In other words, the battery pack 54 can provide sufficient power to the various internal components of the security system 40 (e.g., the controller 56 and the equipment 58) throughout at least one deployment cycle.

The switch system 52 within the enclosure 42 is in physical and/or signal communication with the battery pack 54 and the controller 56. The controller 56 is configured to control the security equipment 58 housed within the enclosure 42. The switch system 52 is configured to operably couple the battery pack 54 to the controller 56. When the switch system 52 is switched closed, for example, the switch system 52 can couple the battery pack 54 to the controller 56 and to the security equipment 58 to power the controller 56 and the equipment 58. The switch system 52 can form a portion of a trigger system for the security system 40. Various exemplary trigger systems for the security system 40 are described in greater detail herein.

In various instances, the default state of the security system 40 can be an idle state. The idle state can correspond to a state of hibernation, an inactive state, or a power-save mode, for example. Battery power can be conserved when the security system 40 is in the idle state. For example, the security system 40 can be in an idle state while the container 10 is being transported over long distances via various transportation methods and/or placed at a storage site for an extended period of time and while the trigger system has not been activated. In other words, the security system 40 can remain in the idle state until an active state is appropriate. If no intruder is detected and/or no theft is imminent, the active state may not be appropriate, for example, and the security system 40 can remain in the idle state.

The security system 40 can be triggered "on" to assume the active state when surveillance and/or communication features are necessary. For example, the active state may be appropriate when the door 12 (FIGS. 1 and 3) of the container 10 is moved to an open position and/or when movement is detected within the container 10. In such instances, the security system 40 can switch between the idle state and the active state for a pre-defined period of time, until the trigger is released, and/or while surveillance of the intruder and/or communication with the intruder and/or a remote monitoring location remains necessary. In such embodiments, the power source, e.g., the battery power from the battery pack 54, can be conserved when the security system 40 is in the idle state, which can correspond to substantial portions of the deployment cycle, as described in greater detail herein.

Inside the housing or enclosure 42 of the security device 40, the surveillance and/or communication equipment 58 can be employed to accomplish the deterrence and surveillance feature described herein. The surveillance and/or communication equipment 58 can be controlled by the controller 56, for example. In various instances, the equipment 58 can include lighting to illuminate the interior of the container 10 and/or a camera and/or other recording device for recording the interior of the container 10 and the occupants, such as any intruders, located therein. The recording device can have visual and/or auditory recording capabilities. The security equipment 58 can also include a GPS device, which can establish the location where the intrusion occurred, as well as the date and time of the intrusion. In certain instances, the security equipment 58 can be coupled to the display panel 59, which can be viewed by any occupants of the container 10. The display panel 59 can provide visual and audio output via a monitor and/or speakers, for example, and can communicate and/or notify the occupants, including any intruders, of the security equipment 58 and various features thereof.

In certain instances, the security equipment 58 can include communication equipment, such that breaches in security can be digitally documented and uploaded to a secure location outside of the enclosure 42. For example, recordings can be streamed and/or transmitted to a remote monitoring service. Additionally or alternatively, the security system 40 may include a telecommunication apparatus such that a security monitoring service can be notified of a security breach in real time and/or near real time. In certain instances, the security system 40 can provide a message to the intruders. In various embodiments, the security system 40 can record GPS data and can provide the GPS coordinates to the remote monitoring service. The GPS equipment can document the precise location of the container 10 when the intrusion occurred for law enforcement and/or insurance claim purposes.

In certain instances, the security system 40 can include more than one discrete security device, which can be positioned relative to the shipping container. For example, various sensor(s), camera(s), video camera(s), speaker(s), mobile telephone(s), GPS device(s), internet source(s), and/or wireless and/or cellular signal receiver(s) can be positioned within the shipping container, and can be positioned within one or more secure, locked, and/or inaccessible housings retained therein. In various instances, multiple security devices can be integrated into a single component. A person having ordinary skill in the art will appreciate that the security system 40 may include additional and/or different surveillance and/or communications devices to achieve different surveillance and/or communication features described herein. The additional surveillance and/or communication equipment can also be in signal communication with the controller 56 and the display panel 59, and can include additional cameras, wireless and/or cellular capabilities, a speaker, a GPS locator, and/or at least one sensor, such as a motion sensor, a vibration sensor, a noise sensor, temperature sensor, and/or an infrared sensor, for example.

In certain instances, the trigger system of the security system 40 can include a motion sensor, a mechanical tripwire or trigger line, and/or a magnetic reed switch, for example. The trigger system can activate the switch system 52 to switch the security system 40 between the idle state and the active state in order to activate the controller 56 and the security equipment 58. Referring primarily to FIGS. 3 and 4, a trigger line 46 is employed to switch the security system 40 between the idle state and the active state. The trigger line 46 extends from the switch system 52 through a small opening 48 (FIG. 4) in the secure enclosure 42 and to the movable door 12 of the container 10. In various instances, the trigger line 46 can have a one-way latching feature, which can allow the line 46 to shorten as the door 12 is swung closed, but not to lengthen as the door 12 is opened. In various instances, the trigger line 46 can come into a state of tension when the door 12 is opened (FIG. 3) which can activate the switch system 52, and thus, switch the security system 40 from the idle state to the active state. The trigger line 46 can be coupled to a ratchet spool 50. In certain instances, the ratchet spool 50 can permit uncoiling of the trigger line 46 and can prevent recoiling of the trigger line 46, for example. In the embodiment depicted in FIG. 4, the security system 40 does not consume any battery power when the security system 40 is in the idle state because, in such instances, the battery pack 54 is not coupled to any current-draining devices.

Another exemplary embodiment including a trigger line is depicted in FIGS. 5-8. The container 210 includes a security system 240 mounted to a sidewall of the container 210. The security system 240 includes a secure enclosure 242 for housing various instruments, controls, and power supplies for the security system 240. A trigger line 248 extends from the enclosure 240 to the door 212a of the container 210. The doors 212a, 212b can be designed such that the door 212a must be opened before the door 212b can be opened. For example, the door 212b can include a flange that is blocked by the door 212a until the door 212a has been opened. Similar to the security system 40 (see FIG. 4), the security system 240 can include a battery pack, switching system, and security equipment. The trigger line 248 can extend from the switching system of the security system 240 to the door 212a of the container 210. A catching device 250 is mounted to the door 212a of the container 210. For example, the catching device 250 can be secured to the door 212a by at least one non-permanent fastener 260, such as a magnet, that is mounted to the catching device 250 and is magnetically attracted to the door 212a of the container 210.

In the embodiment of FIGS. 5-8, the trigger line 248 is a beaded line, which is threaded through a catching aperture 256 in the catching device 250. The trigger line 248 is configured for one-way travel through the catching aperture 256. In use, the trigger line 248 is fed through the catching aperture 256 of the catching device 250 to "set" the trigger system. In certain instances, a weight 254 (FIG. 6) can be secured to the end of the trigger line 248, and the weight 254 can pull the trigger line 248 through the catching aperture 250 to keep the trigger line 248 in the "set" configuration until the door 212a is moved toward an open position. When the door 212a of the container 210 is moved from the closed position toward the open position, the beaded trip line 248 can be "caught" by the catching aperture 256 and movement of the trigger line 248 through the catching aperture 256 can be restrained. As a result, the trigger line 248 can be pulled into a state of tension by the catching aperture 256 on the moving door 212a. At a pre-set tension, the trip line 248 can activate the switching system of the security system 240, such as a switch coupled between the battery pack and controller for the security equipment, as described herein. In certain instances, the trigger system can be activated at approximately 4 to 5 pounds of tension, for example. In other embodiments, the trigger system can be activated at less than 4 pounds or tension or greater than 5 pounds of tension.

In various instances, the trigger line 248 can include a coupler 252, and the trigger line 248 can be configured to fail or break at the coupler 252 when a preset failure tension is achieved. For example, the coupler 252 can fail at 10 pounds of tension. In other instances, the preset failure tension can be greater than 10 pounds of tension or less than 10 pounds of tension, for example. The preset failure tension can be greater than the requisite amount of tension for activating the switch system 52, such that the switch system 52 is already activated when the failure tension is achieved. Failure of the trigger line 248 can prevent an intruder from resetting the trigger system of the security system 40.

Referring again to FIG. 4, in various instances, the trigger line 46 is coupled to the switch system 52, such that, when the trigger line 46 is activated, such as by opening the container door 12, the switch system 52 can activate the battery pack 54 and/or couple the battery pack 54 to the controller 56 of the security system 40. As described in greater detail herein, when the controller 56 is powered by the battery pack 54, the security system 40 can be activated for surveillance, communication, and/or various other security features described herein. Moreover, the controller 56 can be in signal communication with the security equipment 58 described herein, and can issue commands, communicate feedback and/or receive signals therefrom. In certain instances, the controller 56 can command the security equipment 58 to power "on". The security equipment 58 can include internal power supplies and/or may be powered by the battery pack 54.

Figure 9:
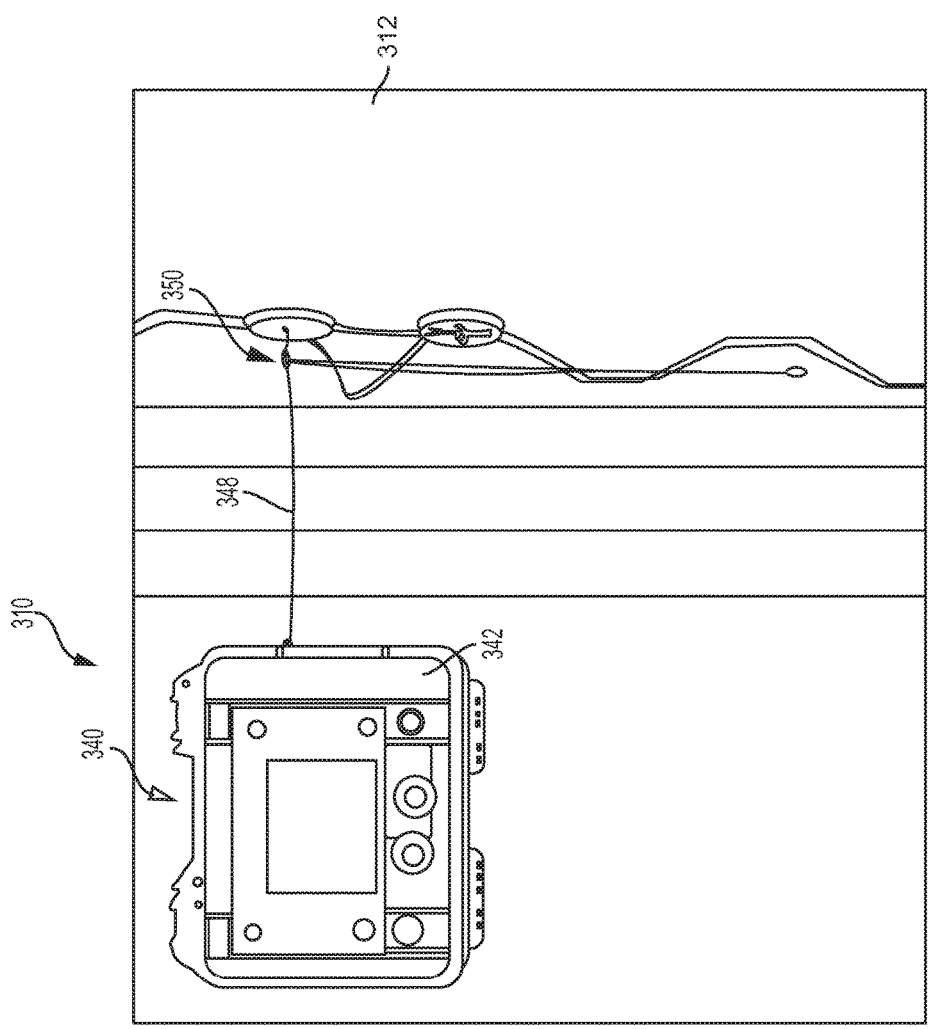
FIG. 9 is perspective view of a security system mounted in a container and a trigger line positioned through a catching aperture mounted to a door of the container, according to various embodiments of the present disclosure.

Referring now to FIG. 9, another embodiment of a trigger line 348 for a security system 340 is depicted in a container 310. The trigger line 348 extends from an enclosure 342 of the security system 340 to a door 312 of the container 310. The enclosure 342 defines a robust enclosure, which can be locked to protect the contents of the security system 340 housed therein. In the depicted embodiment, the enclosure 342 comprises a PELICAN™ case. In certain instances, a control panel and/or buttons can be positioned on the outside of the enclosure 342. The security system 340 may be armed and/or disarmed by entering a control sequence, such as a code, into the control panel and/or buttons on the exterior of the enclosure 342. The enclosure 342 also includes viewing apertures, which can permit one or more recording devices within the enclosure 342 to view the inside of the container 310.

Figure 10:
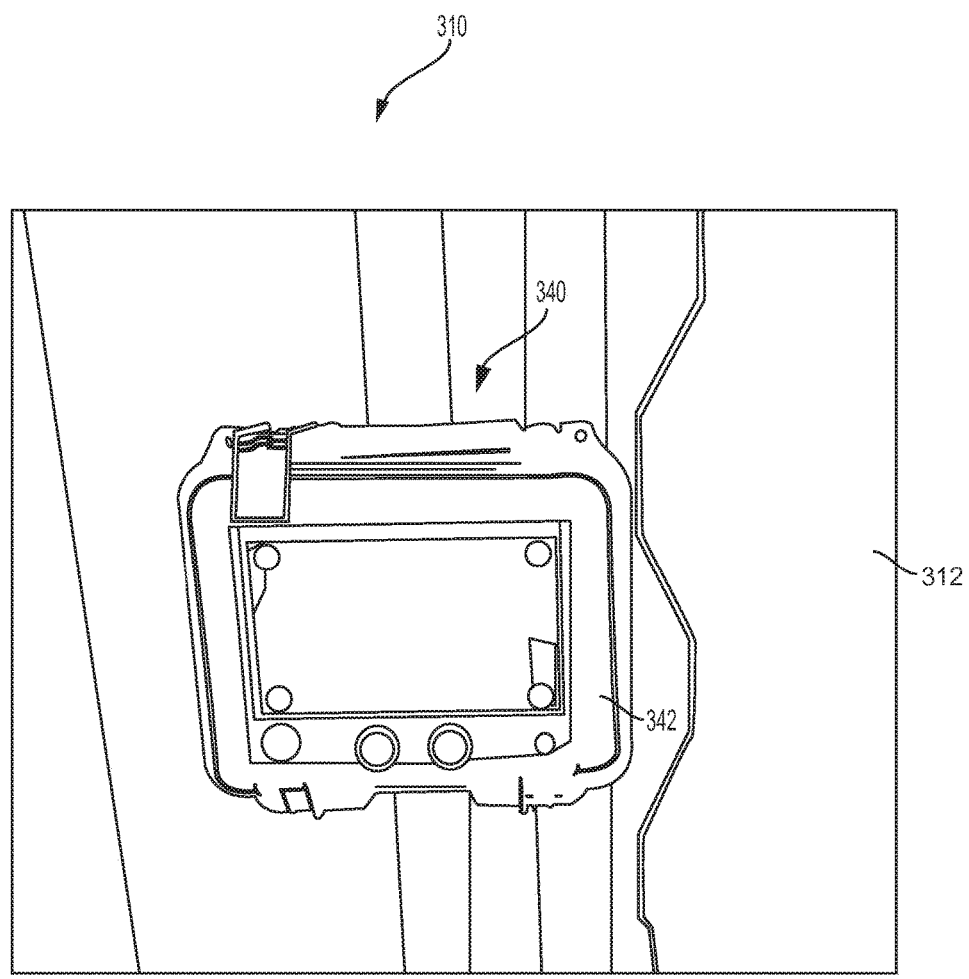
FIG. 10 is a perspective view of an enclosure of the security system of FIG. 9.

The PELICAN™ case enclosure 342 is also shown in FIG. 10. In certain instances, the enclosure 342 can include a magnetic reed switch, as described in greater detail herein. Such a magnetic reed switch can be configured to interact with the door 312 of the container 310. For example, the door 312 can be ferrous and/or can include a substantially ferrous portion adjacent to the enclosure 342. The magnetic reed switch can move to a closed position when such a door 312 of the container 310 is moved away from and/or out of proximity with the enclosure 342. Furthermore, the magnetic reed switch can move to an open position when the door 312 of the container 310 is moved toward and/or into proximity with the enclosure 342. In such instances, the magnetic reed switch can trigger the security system 340 from an idle state to an active state based on the position of the door 312 relative to the enclosure 342. In other instances, a Hall Effect sensor or other magnetic sensor can be used to detect when the door 312 is moved away from the closed position.

Figure 11:
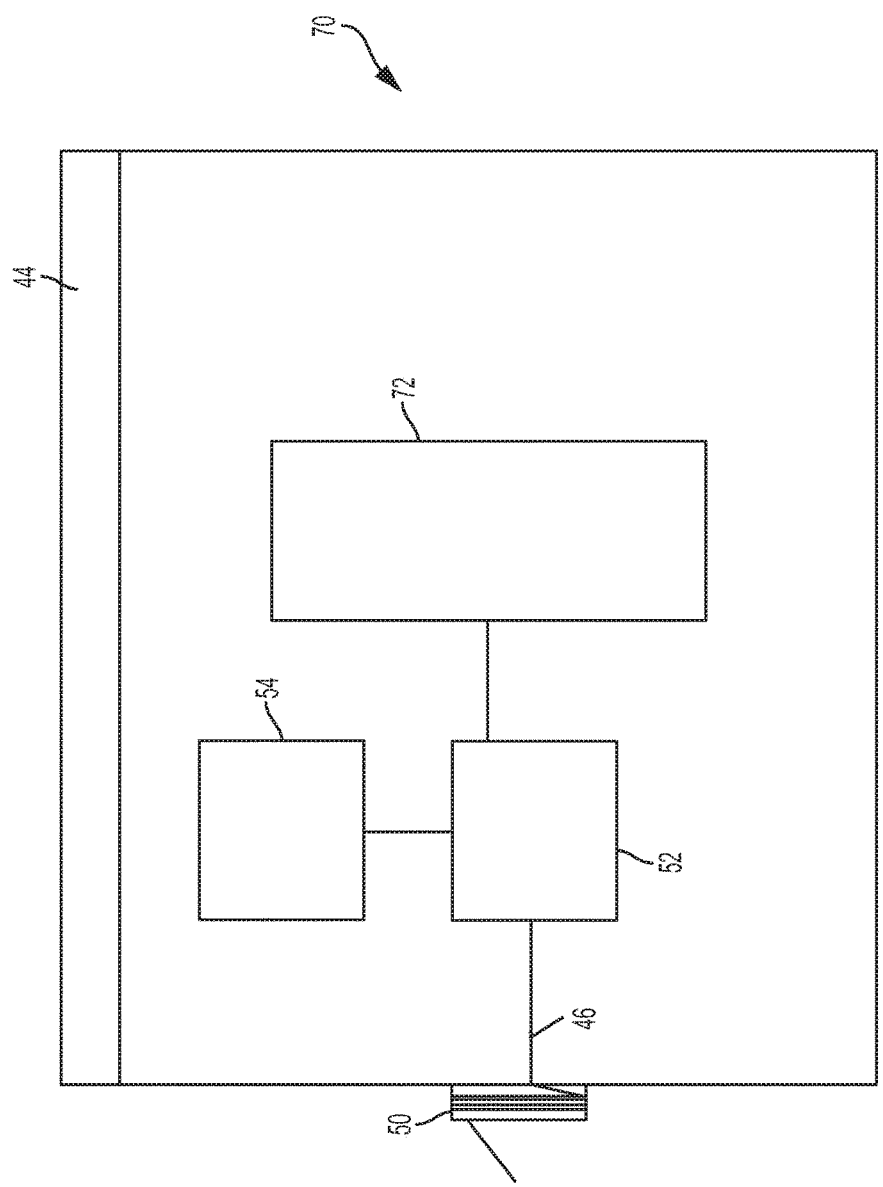
FIG. 11 is a schematic of a security system, according to various embodiments of the present disclosure.

In various instances, a controller, as well as the security equipment for a security system, can be confined within a single prefabricated component. For example, referring now to FIG. 11, the security system 70 can be similar to the security system 40 and can include a "smart" mobile telephone 72, such as an S4 smart phone, and/or a similar device. The smart device 72 can be programmed for the desired surveillance and/or communication features. For example, the smart device 72 can record the intruder's face and/or voice, communicate with the intruder, communicate and/or record the information from an intrusion, and/or call local police or other security personnel to the scene, for example. In other words, the smart device 72 can incorporate various features of the security equipment 58 (FIG. 4) of the security system 40 therein. The smart device 72 can be off, or in a power-save mode, until the switch system 52 activates, or turns on, the smart device 72 by coupling the battery pack 54 with the device 72, for example. The switch system 52 can be coupled to a trigger line, reed switch, and/or motion sensor, for example, as described herein. When the smart device 72 is powered on by the switch system 52, the smart device 72 can be configured to implement various surveillance and/or deterrent features described herein.

Figure 12:
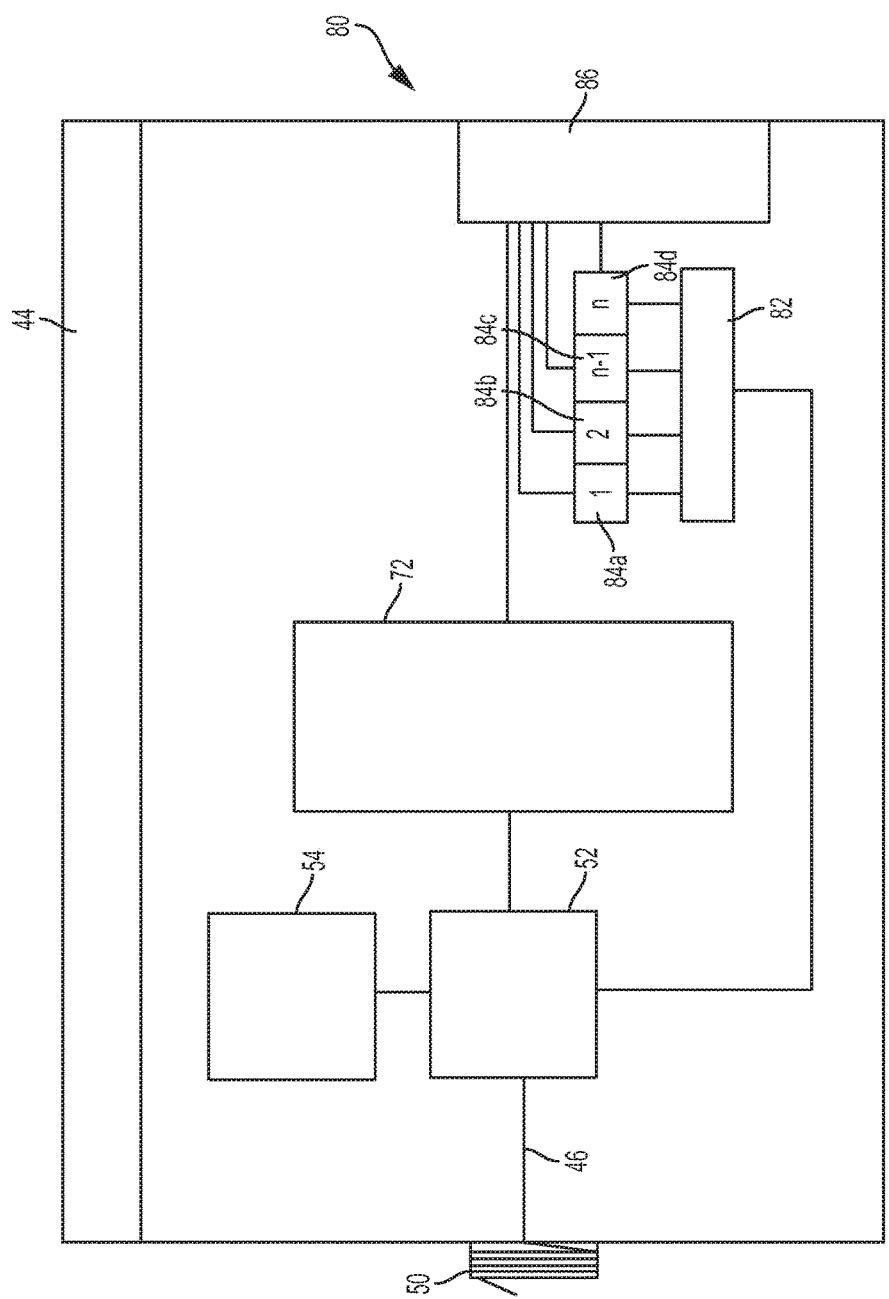
FIG. 12 is a schematic of a security system, according to various embodiments of the present disclosure.

Referring now to FIG. 12, in various instances, a security system 80 can include the smart device 72, as well as an additional microprocessor 82 and/or controls and/or sensors 84a, 84b, 84c, and/or 84d, for example. In various instances, the additional sensors and/or controls 84a, 84b, 84c, and/or 84d can be coupled to a display 86, for example. The smart device 72 can communicate and/or display information to occupants in the container via the display 86. In other instances, the smart device 72 can be coupled to a control panel, which can permit the authorized user of the security system 80 to arm and/or disarm the security system 80 via input to the control panel. Such a control panel can be accessible from the exterior of the enclosure and/or can require key access to the interior of the enclosure. In certain instances, the smart device 72 can be coupled to the microprocessor 82 such that the smart device 72 and the microprocessor 82 can communicate. For example, the smart device 72 can communicate an operational state to the microprocessor 82, which can select the appropriate sensor(s) and/or control(s) 84a, 84b, 84c, and/or 84d based on the operational state output from the smart device 72. In certain instances, the microprocessor 82 can be coupled to the audio output, e.g., earphone jack, of the smart device 72.

Figure 13:
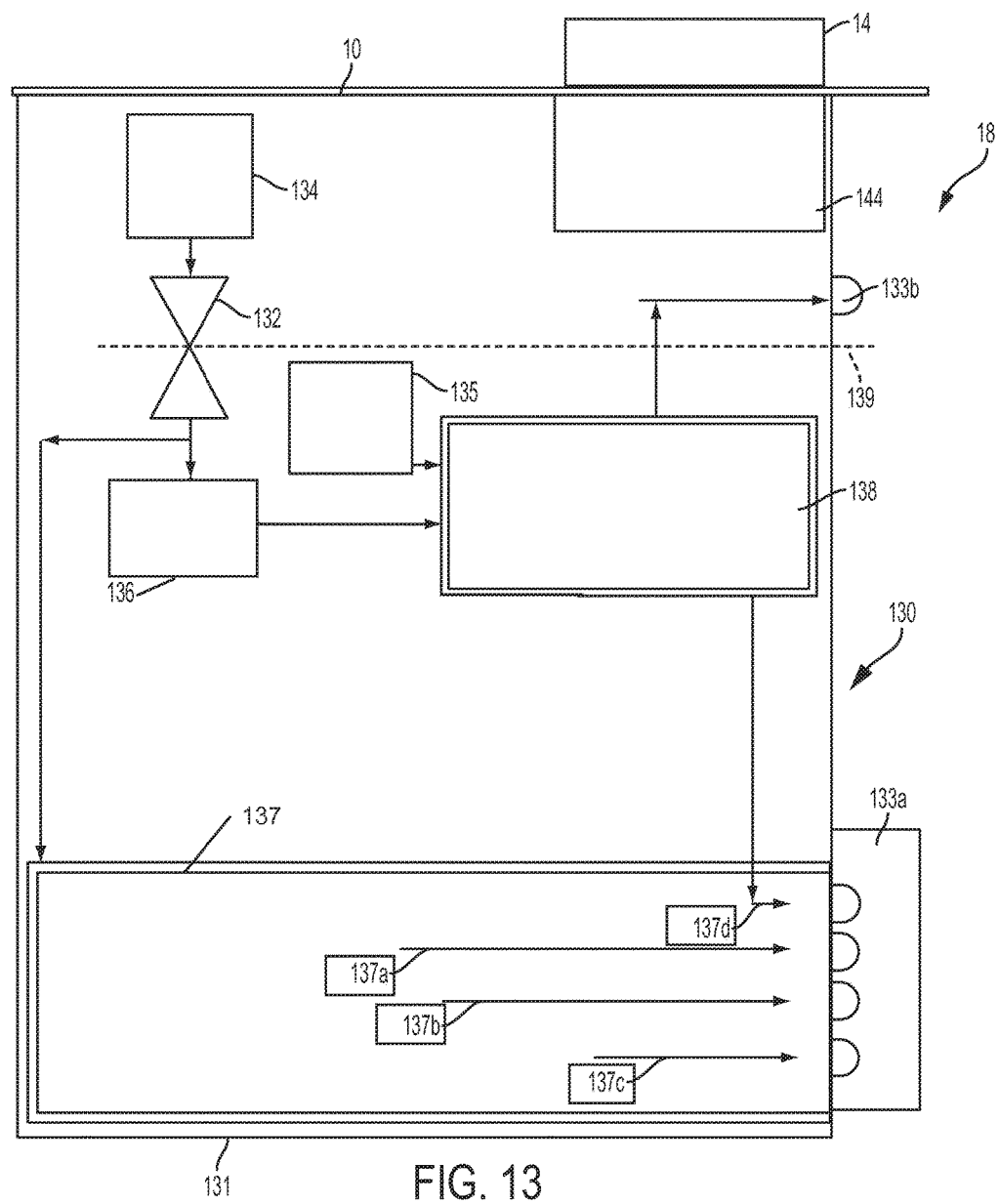
FIG. 13 is a schematic of a security system, according to various embodiments of the present disclosure.

Referring now to FIG. 13, a security system 130 is depicted. The security system 130 is positioned within the interior cavity 18 of the container 10. As described in greater detail herein, the security system 130 includes a secure enclosure 131, which is attached to a wall of the container 10 by a magnetic attraction between an attachment portion 144 (e.g., a magnet) of the enclosure 131 and a magnetic mat 14. For example, the magnetic attraction from the attachment portion 144 of the security system 140 through the wall of container 10 to the magnetic mat 14 can clamp the enclosure 131 to the wall of the container 10. Such an arrangement can be employed to secure the enclosure 131 to the container 10 even when the container is non-ferrous or insufficiently ferrous to attract the magnetic attachment portion 144.

The security system 130 includes a main switch 132 intermediate a battery pack 134 and a master controller 136. The main switch 132, battery pack 134, and master controller 136 can be enclosed within the enclosure 131. The switch 132 is in communication with at least one security device 137, such as security devices 137a, 137b, 137c, and/or 137d, for example. In certain instances, at least two security devices 137a, 137b, 137c, and/or 137d can be integrated into a single component and/or at least one security device 137a, 137b, 137c, and/or 137d can comprise a separate component within the enclosure 131. When the switch 132 is closed, the security device(s) 137a, 137b, 137c, and/or 137d can be powered by the battery pack 134. In certain instances, the security devices 137a, 137b, 137c, and/or 137d can be controlled by the master controller 136 and/or can include independent controllers.

Various pieces of information gathered by the security device(s) 137 can be broadcast and/or displayed through an output device, such as a display panel 133a. The display panel 133a can be protected by protective glass and/or plastic, for example. Accordingly, the security features of the security device(s) 137 can be overt to all occupants in the container 10. As a result, the security device(s) 137 can be highly deterrent to attempted thefts. The security device(s) 137 can include a lighting circuit 137a, a display 137b, decoy audiovisual features 137c, and/or a camera 137d. The lighting circuit 137a can include a photocell and motion sensor. The camera 137d can selectively record video and/or photographs within the container 10. The camera 137d can be coupled to the display 137b, and images of the occupants in the container 10 can be displayed on a display on an outside face of the enclosure 131. For example, the enclosure 131 can include a display monitor. Such a display monitor can be approximately 3 inches wide. In other embodiments, the display monitor can be larger than 3 inches wide and/or smaller than 3 inches wide. The size of the display monitor can depend on the size of the secure enclosure 131, for example. The decoy audiovisual features 137c can include noises, such as beeping and/or alarms, for example, and/or lights, which may flash and/or pulse, for example. These features can suggest that the security system 130 is connecting to the internet and/or contacting enforcement personnel, for example.

The switch 132 is also coupled to the master controller 136. When the switch 132 is closed, the master controller 136 can be powered. The master controller 136 shown in FIG. 13 is also in communication with supporting security device(s) 138. The supporting device(s) 138 can include camera controls, an internet connection feature, audio input, audio output, a GPS device, and/or at least one sensor, such as a motion sensor, a vibration sensor, a heat sensor, a noise sensor, an infrared sensor, and/or combinations thereof, for example. In certain instances, at least two supporting devices 138 can be integrated into a single component and, in other instances, at least one supporting device 138 can comprise a separate component within the enclosure 131. In various instances, the supporting security device(s) 138 operate covertly. The reader will appreciate that the types and operations of the supporting security device(s) 138 in a security system can vary in scope from absent and/or non-employed to more advanced. In more advanced embodiments, the supporting security device(s) can collect and transmit evidence via global web and/or wireless and/or cellular connectivity. For example, the supporting security device(s) 138 can permit two-way dialogue between the container 10 and remote security monitors.

In at least one embodiment, the supporting device(s) 138 can be in communication with an output device, such as a speaker and/or microphone 133b. Additionally or alternatively, the supporting device(s) 138 can be in communication with one of more security device(s) 137a, 137b, 137c, and/or 137d. For example, a supporting device 138, such as a GPS device, can be in communication with the camera 137d to operably communicate the GPS coordinates of the security system 130 to the camera 137d.

A secondary battery pack 135 can selectively power the supporting security devices 138. The secondary battery pack 135 can output a different voltage than the battery pack 134. For example, the battery pack 134 can output 12 volts and the secondary battery pack 135 can output 5 volts. In other instances, the output voltage from the battery pack 134 and the secondary battery pack 135 can be equivalent. In certain instances, the master controller 136 can communicate with the secondary battery pack 135 and/or with the supporting device(s) 138 to turn on the supporting device(s) 138. For example, the master controller 136 can comprise a mechanical trigger, such as a solenoid, that powers on the supporting device(s) 138.

In certain instances, the main switch 132 can be coupled to a trigger line 139, which can close the switch 132 when the trigger line 139 is under sufficient tension, as described herein. In other instances, the main switch 132 can be coupled to a magnetic sensor, such as a reed sensor, for example, that is configured to detect when the door of the container is opened. Additionally or alternatively, the main switch 132 can be coupled to a motion sensor. In some instances, the motion sensor can be powered on when the trigger line 139 is tripped or activated. In other instances, a separate power source, such as a secondary battery, can power the motion sensor throughout the deployment cycle regardless of the position of the main switch 132. In such instances, the lifespan of the secondary battery may limit the duration of a deployment cycle.

Figure 14:
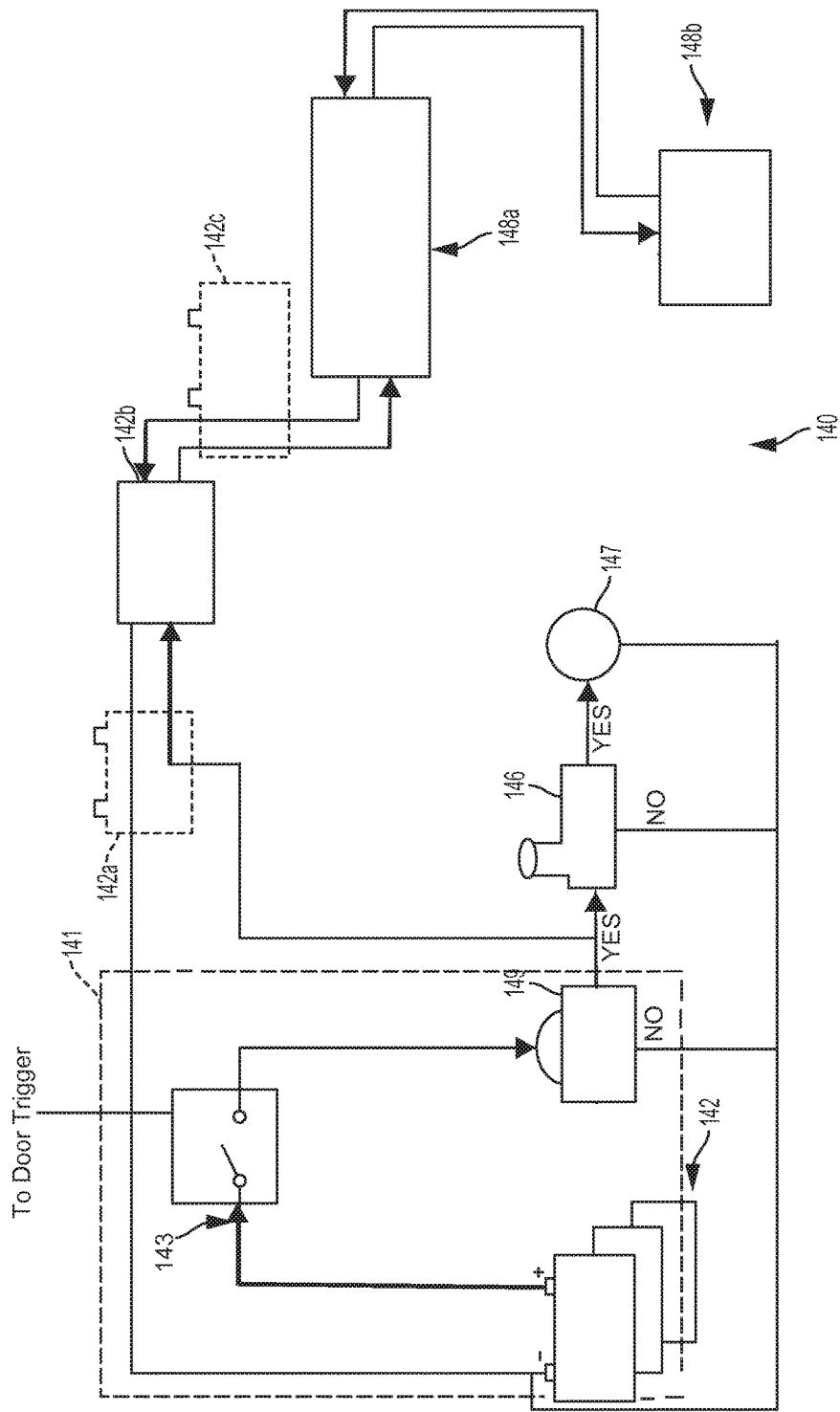
FIG. 14 is a diagram of a control circuit for a security system, according to various embodiments of the present disclosure.

Referring now to FIG. 14, a security system 140 that includes a battery pack 142, a switching circuit 141, and security equipment 148a, 148b is depicted. The battery pack 142 includes at least one battery. The battery pack 142 can include multiple batteries connected in parallel. The battery pack 142 is coupled to the switching circuit 141, which includes a switch 143 and a motion detector 149. For example, the switch 143 is coupled to the motion detector 149. The motion detector 149 can comprise a passive infrared motion sensor, for example. In various instances, when the switch 143 is closed, such as by a trigger line or other trigger system, the motion detector 149 can be coupled to the battery pack 142 and powered on. The switch 143 can comprise a kill switch, such that the switch 143 does not reopen until it is manually reset. In such instances, an intruder would be unable to reopen the switch 143 to deactivate the security system 140. When motion is detected by the motion detector 149, a photocell 146 can determine if there is sufficient visible light in the container to visualize the intruder and/or record the intruder. If the light is determined to be insufficient by the photocell 146, a light 147 can be powered and turned on, for example. Moreover, when motion is detected by the motion detector 149, the security equipment 148a, 148b can be powered on.

In various instances, the security equipment can include a recorder 148a, for example, which can record video and/or images of the interior of the container, for example. The security equipment can also include a GPS antenna 148b, which can record the GPS coordinates of the container. Additional security and/or deterrence features and/or equipment can be powered by the battery pack 142 when the switching circuit 141 is switched closed. In various instances, after a predefined period of time has elapsed without the motion sensor 149 detecting further motion, the motion sensor 149 can move to an open position such that the battery pack 142 is no longer coupled to the security equipment 148a, 148b. For example, the motion sensor 149 can include an internal timer. In certain instances, the security equipment 148a can communicate with the security equipment 148b. For example, the GPS antenna 148b can provide GPS coordinates to the recorder 148a when the recorder 148a is powered.

In various instances, additional batteries and/or voltage converters 142a, 142b, and/or 142c can also be coupled between the main switch 143 and the security equipment 148a, 148b. For example, if the recorder 148a and GPS antenna 148b require a different voltage input than the battery pack 142, the system 140 can include a voltage converter 142b intermediate the battery pack 142 and the equipment 148a, 148b. For example, the voltage converter 142b can step down the voltage from 12 volts to 5 volts. In other instances, the voltage converter 142b can step up the voltage between the switching system 141 and the security equipment 148a, 148b. In certain embodiments, the system 140 can also include additional batteries 142a, 142c intermediate the battery pack 142 and the recorder 148a. In instances where only one of the security devices 148a, 148b requires a different voltage input than the battery pack 142, the devices 148a, 148b can be connected in parallel and the voltage converter 142b can be connected in series with the security device 148a, 148b that requires the different voltage.

In use, the switch 143 of the security system 140 can initially be open and can remain open until the trigger line, or other trigger system, coupled to the switch 143 is actuated. For example, the trigger can be actuated when the door of the container is moved to an open position. Actuation of the door trigger is configured to close the switch 143, which can couple the motion sensor 149 to the battery pack 142. When the motion sensor 149 is powered by the battery pack 142, the motion sensor 149 is configured to detect motion within the container. If motion is detected, the photocell 146 is configured to determine if there is sufficient visible light in the container. If the visible light in the container is insufficient, the light 147 is powered on. Furthermore, when motion is detected by the motion sensor 149, the security equipment 148a, 148b is also powered. Furthermore, when the security equipment 148a, 148b requires a different voltage input than the voltage provided by the battery pack 142, the voltage converter 142b can convert the voltage intermediate the battery pack 142 and the security equipment 148a, 148b.

In various instances, the information gathered by the security equipment 148a, 148b, such as images, videos, and/or GPS coordinates, for example, can be stored in the internal memory of the security system 140. In other instances, the information gathered by the security system 140 during periods of active surveillance can be transmitted outside the enclosure of the security system during the deployment cycle and/or contemporaneously with the period(s) of active surveillance.

Figure 15:
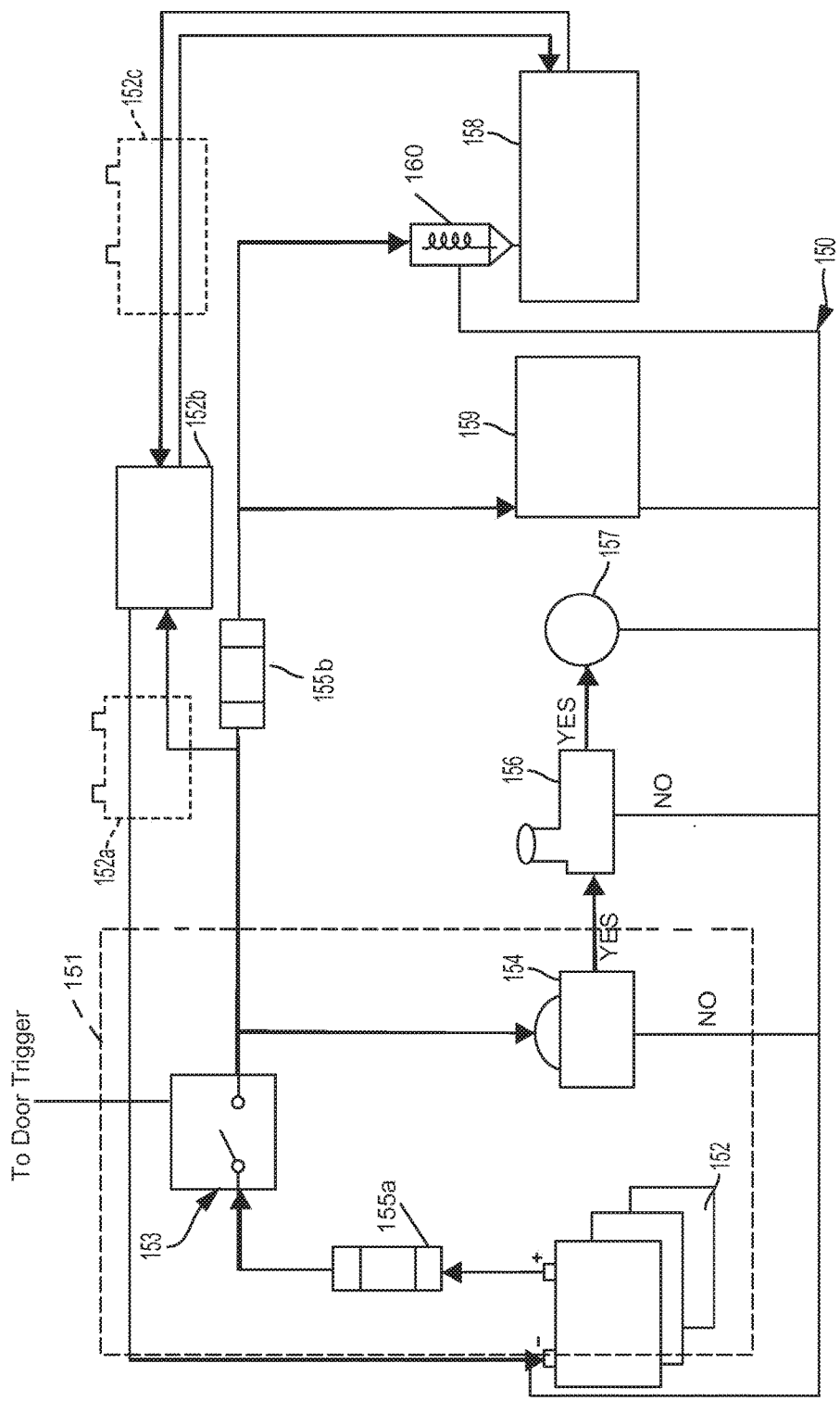
FIG. 15 is a diagram of a control circuit for a security system, according to various embodiments of the present disclosure.

Referring now to FIG. 15, an alternative security system 150 is depicted. The security system 150 includes a battery pack 152, a switching circuit 151, and security equipment 158. The battery pack 152 includes at least one battery. The battery pack 152 can include multiple batteries connected in parallel. The battery pack 152 is coupled to the switching circuit 151, which includes a switch 153 and a motion detector 154. For example, the switch 153 is coupled to the motion detector 154. The motion detector 154 can comprise a passive infrared motion sensor, for example. In various instances, when the switch 153 is closed, such as by the trigger line or other trigger system described herein, the motion detector 154 can be coupled to the battery pack 152 and powered on. The switch 153 can comprise a kill switch, such that the switch 153 does not reopen until it is manually reset. In such instances, an intruder would be unable to reopen the switch 153 to deactivate the security system 150. Additionally, when motion is detected by the motion detector 154, a photocell 156 can determine if there is sufficient visible light in the container. If the light is determined to be insufficient by the photocell 156, a light 157 can be powered and turned on, for example. The motion detector 154 can include an internal timer, for example. Moreover, when motion is detected by the motion detector 154, the security equipment 158 can be powered on.

In various instances, the security equipment 158 can include a smart device, such as a smart mobile telephone, as described herein, for example, which can record images and/or video of the interior of the container when activated. The security equipment 158 can be programmed to implement various security and/or communication features described herein. The security system 150 also includes a control relay 159, a failure fuse 155b, and a mechanical trigger, such as a solenoid 160, which are positioned between the security equipment 158 and the switching circuit 151. The solenoid 160 is configured to turn on the security equipment 158 when the switch 153 is closed. After the security equipment 158 is powered on by the solenoid 160, the control relay 159 can close, which can cause the fuse 155b to fail. Accordingly, the security equipment 158 is configured to continue operating without the solenoid 160 continuing to draw power from the system 150. Additionally, the fuse 155b can ensure the solenoid 160 is only powered on a single time. In certain instances, the security system 150 can also include fuse 155a. Fuse 155a can provide over current protection to the system 150. For example, fuse 155a can be a larger, slow burn fuse and fuse 155b can be fast-burn planned failure fuse.

In various instances, additional batteries and/or voltage converters 152a, 152b, and/or 152c can also be coupled to the security equipment 158. For example, if the security equipment 158 requires a different voltage input than the battery pack 152, the system 150 can include the voltage converter 152b intermediate the battery pack 152 and the security equipment 158. For example, the voltage converter 152b can step down the voltage from 12 volts to 5 volts. In other instances, the voltage converter 152b can step up the voltage between the switching system 151 and the security equipment 158. In certain embodiments, the system 150 can also include additional batteries 152a, 152c intermediate the battery pack 152 and the security equipment 158.

In use, the switch 153 of the security system 150 can initially be open and can remain open until the trigger line, or other trigger system, coupled to the switch 153 is actuated. For example, the trigger line can be actuated when the door of the container is moved to an open position. Actuation of the trigger line is configured to close the switch 153, which can couple the motion sensor 154 to the battery pack 152. When the motion sensor 154 is powered by the battery pack 152, the motion sensor 154 is configured to detect motion within a container. If motion is detected, the photocell 156 is configured to determine if there is sufficient visible light in the container. If the visible light in the container is insufficient, the light 157 is powered. When the switch 153 closes, the security equipment 158 is also powered on via the failure fuse 155b/solenoid 160 circuit. After the security equipment 158 has been powered on, the control relay 159 can close to burn out the failure fuse 155b such that the battery pack 152 is no longer coupled to the solenoid 160. For example, the control relay 159 can be configured to close several seconds after the switch 153 has closed. In such instances, the control relay 159 can include an internal timer, for example. Current can continue to flow to the security equipment 158 via the voltage converter 152b circuit, and the security equipment 158 can remain on until the power from the battery pack 152 and/or any additional batteries 152a, 152c is drained.

Figure 16:
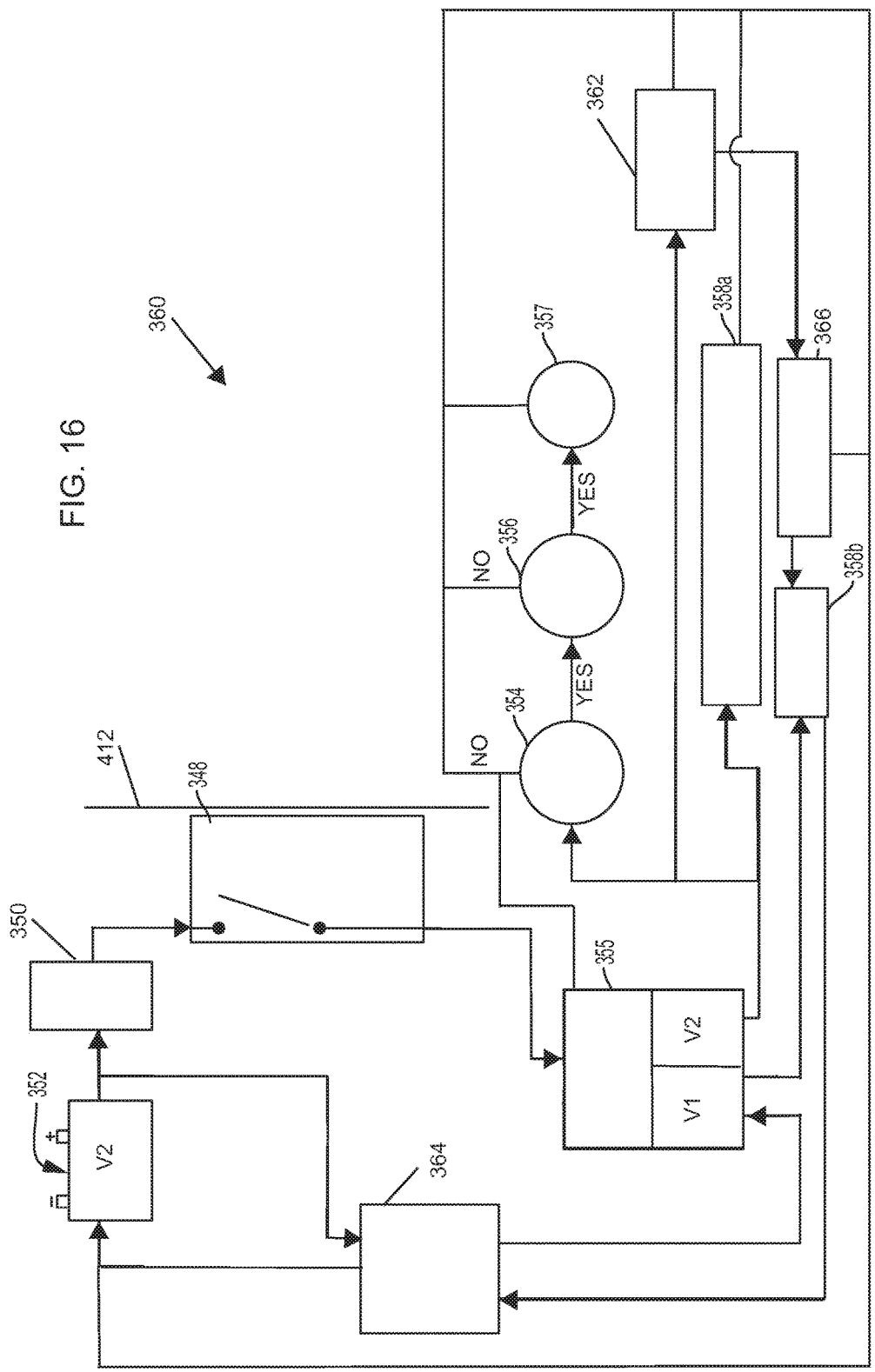
FIG. 16 is a diagram of a control circuit for a security system, according to various embodiments of the present disclosure.

In still other instances, referring now to FIG. 16, a trigger system for a security system 360 can include a magnetic switch 348, such as a magnetic reed switch, for example. The magnetic switch 348 can be positioned within the enclosure of the security system and/or can be mounted thereto, for example. In various instances, a door 412 of the container can comprise a magnetic and/or ferrous material, such as steel, for example. When the door 412 is open, the magnetic portion of the door can interact with the magnetic switch 348 to close the circuit at the switch 348, which closes the relay 355. When the door is closed, the magnetic switch 348 can open the circuit at the switch 348 due to the lack of proximity of the magnetic portion of the door, which opens the circuit at relay 355. The magnetic switch 348 can operably connect a power supply, such as a battery pack 352, to security equipment 358a, 358b of the security system. The battery pack 352 includes at least one battery. In certain instances, the battery pack 352 can include multiple batteries connected in parallel.

The security system 360 also includes a wind-down timer switch 350. In various instances, when the wind-down timer switch 350 is winding down, the time switch 350 can remain open, for example, and when the timer switch 350 has expired, the timer switch 350 can close, for example. Accordingly, to set the trigger system of the security system 360, the operator can start the wind-down timer 350 (to open the circuit at the timer switch 350) and then close the door upon exiting the container (to open the circuit at the magnetic switch 348 and the relay 355). Upon expiration of the wind-down timer 350, the circuit can be closed at the time switch 350, but can remain open at the magnetic switch 348 and the relay 355. Accordingly, the system 360 will not be powered on until the door 412 of the container is opened, which closes the magnetic switch 348 and the relay 355 and provides power to the security system 360. In such instances, when the door 412 is closed and the magnetic switch 348 and the relay 355 are open, battery power can be conserved. For example, when the magnetic switch 348 is open, the power consumption of the security system 360 can be zero. As depicted in FIG. 16, the magnetic switch 348 and the relay 355 are separate components that are connected in parallel. In other instances, the magnetic switch 348 and the relay 355 can be integrated into a single component.

In the embodiment of FIG. 16, the timer switch 350, the magnetic switch 348, and the relay 355 are operably coupled to a motion detector 354. The motion detector 354 can comprise a passive infrared motion sensor, for example. In various instances, when the switches 350, 348 and relay 355 are closed, the motion detector 354 can be coupled to the battery pack 352 and powered on. When motion is detected by the motion detector 354, a photocell 356 can determine if there is sufficient light in the container. If the light is determined to be insufficient by the photocell 356, a light 357 can be powered and turned on, for example.

When a component of the system 360 requires a different voltage than the voltage output from the battery pack 352, the system 360 can include a voltage regulator, such as regulator 364. For example, the system 360 includes the voltage regulator 364 between the battery pack 352 and the security equipment 358b. In certain instances, the voltage regulator 364 can step down the voltage from 12 volts to 5 volts, for example. In other instances, the voltage regulator 364 can step up the voltage between the battery pack 352 and the relay 355. Moreover, the relay 355 can be a double pole relay. For example, the relay 355 can include a 5 volt switch for the security equipment 358b and a 12 volt switch for various other components in the system 360. The relay 355 can be a timer relay, which remains closed for a preset period of time after the magnetic switch 348 has determined that the door 412 of the container has been opened. For example, the relay 355 can include an internal timer.

The system 360 also includes security equipment 358a, a second timer switch 362, and a mechanical trigger, such as a solenoid 366. The security equipment 358a is configured to operate when the relay 355 closes, which couples the battery pack 352 to the security equipment 358a. Additionally, when the relay 355 closes, the second timer switch 362 can close for a period of time to power the solenoid 366, which powers on the security equipment 358b. For example, the solenoid 366 can mechanically activate a power button of the security equipment 358b. Thereafter, the security equipment 358b can remain on even when power is no longer supplied to the solenoid 366. The security equipment 358b can automatically power down after a predefined period of time. Moreover, a subsequent triggering of the magnetic switch 348 can reinitiate the system 360 and turn the security equipment 358b on again via the solenoid 366. In certain instances, current may only be supplied to the security equipment 358a when motion has been detected by the motion detector 354. Additionally or alternatively, current may only be supplied to the second timer switch 362, and thus to the solenoid 366, when motion has been detected by the motion detector 354.

In certain instances, the relay 355 can be configured to close for a first period of time, and the second timer switch 362 can be configured to close for a second period of time. For example, the second period of time can be 6 to 8 seconds, for example. In other instances, the second period of time can be less than 6 seconds or greater than 8 seconds. The first period of time can be greater than the second period of time. For example, the first period of time can be 10 minutes. In other instances, the first period of time can be less than 10 minutes or greater than 10 minutes. The first period of time can be less than 60 minutes, for example. In certain instances, the security equipment 358b can also include an internal timer, and the security equipment 358b can automatically shut down when the internal timer expires. The internal timer can run for a third period of time, which can be less than the first period of time and greater than the second period of time. Additionally or alternatively, the security equipment 358b can include an internal motion sensor, and the security equipment 358b can shut down automatically after a predefined period has passed without the internal motion detector of the security equipment detecting motion.

In various instances, the security system can include an electronic trigger, such as a low power draw electronic motion sensor, for example, as described in greater detail herein. The electronic motion sensor can be coupled to a security device, such as an alarm system and/or a recording device. In certain instances, the security device can include the electronic motion sensor. For example, the security device can include a microcontroller that is configured to control the motion sensor, as well as the alarm system and/or recording device. A motion sensor and an alarm system can be incorporated into a single circuit board, for example.

In various instances, the trigger system of various security systems described herein includes include a two-step circuit. In particular, the two-step circuit includes a first switching system and a second switching system, which can be connected in parallel, for example. In other instances, the switching systems can be connected in series. Both switching systems must be closed before the trigger system can activate the security equipment of the security system. The first switching system can include a mechanical switch, such as a trigger line that is configured to close a first switch when the door of the container is opened, as described in greater detail herein. In other instances, the first switching system can include a magnetic switch that is closed when a magnetic (e.g., ferrous) portion of the door is moved away from the magnetic switch, as described in greater detail herein. The second switching system can include a motion sensor, as also described in greater detail herein. The second switching system can move to the closed position when motion is detected and can remain in the closed position until a pre-defined period has expired without the motion sensor detecting further movements and resetting.

Figure 17:
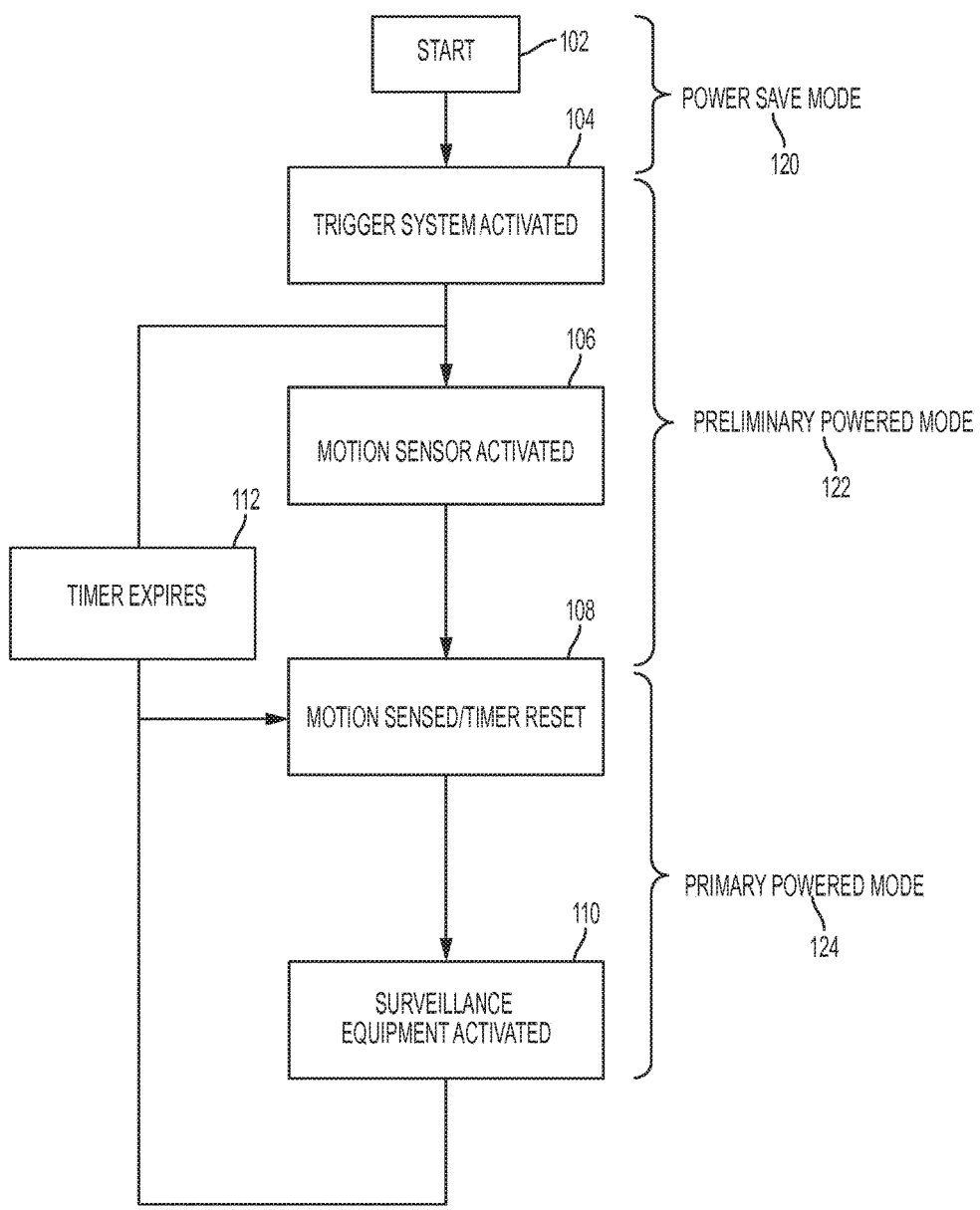
FIG. 17 is a flowchart depicting a two-step switching method for a security system, according to various embodiments of the present disclosure.

A flow chart depicting a two-step switching method for an exemplary security system is depicted in FIG. 17. At step 102, the security system can begin in a default, power-save or idle mode 120. Both switching systems of the two-step circuit can be open at step 102. At step 104, the first switching system can be activated, such as by opening the door of the container, which can cause the security system to enter the preliminary powered mode 122. In the preliminary powered mode 122, active surveillance and/or security may be not initiated; however, a motion sensor of the security system can be activated at step 106. The security system can remain in the preliminary powered mode 122 until the motion sensor detects motion at step 108. Detection of motion can cause the security system to enter the primary powered mode 124. Additionally, when the motion sensor detects motion, a timer can be started. In the primary powered mode 124, various active surveillance and/or communication features described herein can be implemented. For example, the deterrent features and/or evidence collection features described herein can be active. The security system can remain in the primary powered mode 124 as long as motion is detected. When motion has not been detected for a predefined period of time, i.e., when the timer expires at step 112, the security system can return to the preliminary power mode 122. In other instances, when motion continues to be detected and the timer expires, the security system can reinitiate the primary powered mode 124, for example.

In certain instances, a trigger system or switching circuit for a security system can include a low current draw motion sensor. For example, the trigger system can include a motion sensor that is configured to draw less than 10 micro amps of current during active use. In such instances, the motion sensor can remain on for an entire deployment cycle. In other words, the security system may not include a separate switching circuit for powering on the motion sensor.

Referring now to FIG. 18, a control schematic for a security system is depicted. The control schematic includes a low current draw motion sensor 552, which can be powered on throughout a deployment cycle. The motion sensor 552 can be a passive infrared motion sensor, for example, such as an EX-35R passive infrared motion sensor by Optex, Inc. The motion sensor 552 is coupled to a first relay 554, a second relay 556, an alarm system 560, and at least one ancillary or supporting device 558. The alarm system 560 can comprise a prefabricated alarm system, which can be coupled to one of the trigger systems (e.g., trigger line, reed switch, etc.) disclosed herein. For example, the alarm system 560 can comprise a SN 5100 MP alarm by Soan Electronic Technology Co., Ltd. The supporting device(s) 558 can include a GPS logging device, audio recording device, video recording device, temperature recording device, and/or vibration recording device, for example. In at least one embodiment, a supporting device can comprise a Z12 Security Camcorder by Zetta Systems Ltd., for example.

The relays 554 and 556 are positioned between the motion sensor 552 and the alarm system 560, as well as the at least one ancillary or supporting device 558 such that, when the motion sensor 552 detects movement, the relays 554 and 556 provide power to the alarm systems 560 and the ancillary device(s) 558 of the security system for a period of time. The first relay 554 can be an ELK-924 Sensitive Relay from Elk Products, Inc. and the second relay 556 can be an ELK-960 Timer Relay Module from Elk Products, Inc., for example. The second relay 556 can include an internal timer, for example. In combination, the relays 554 and 556 can detect a low output current from the motion sensor 552 when motion is detected and can close for a set period of time after the motion has been detected. Accordingly, the momentary output of motion sensor 552 can operably power the alarm system 560 and the supporting device(s) 558 for a period of time.

Figure 19A:
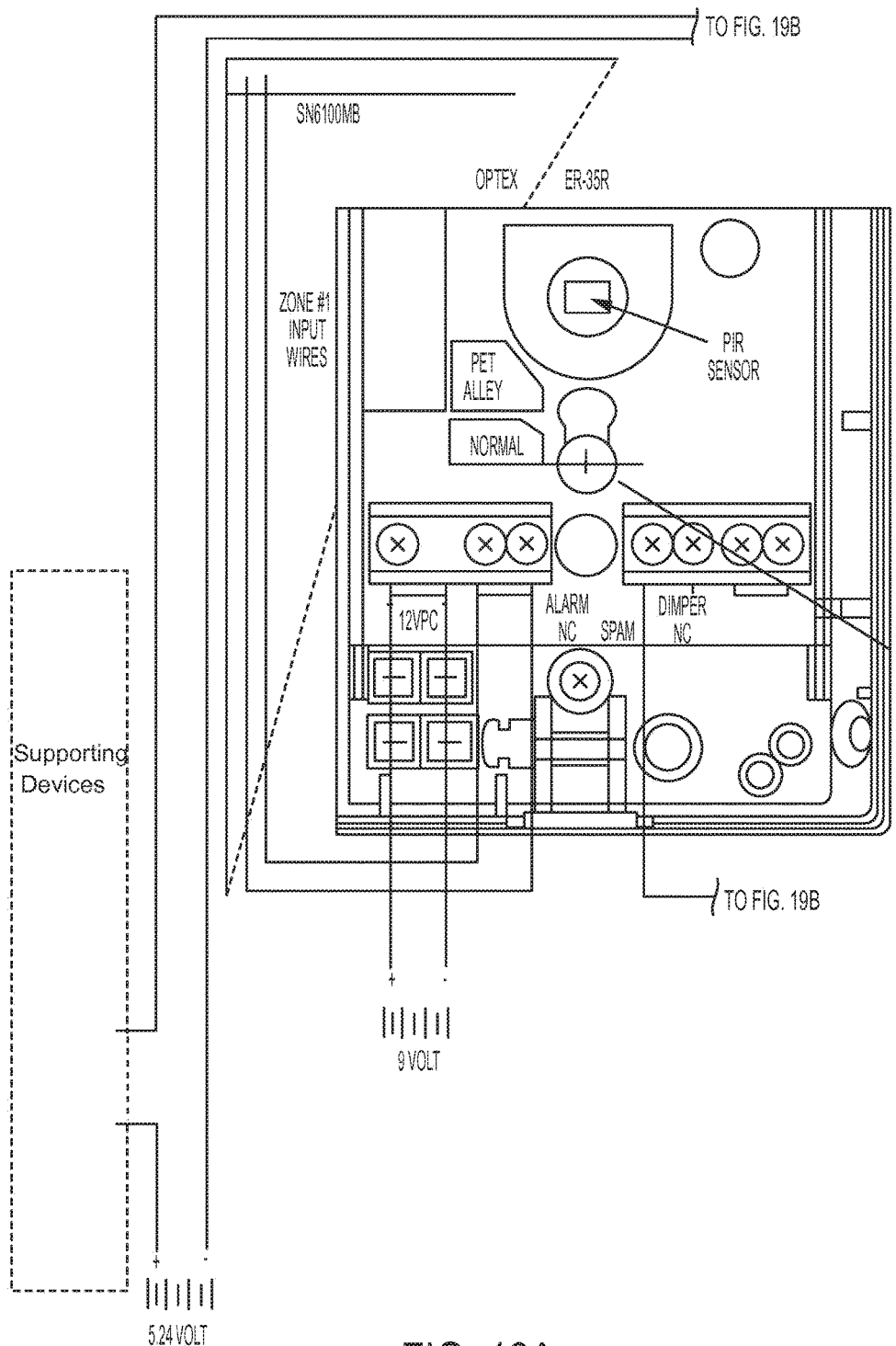
FIGS. 19A-19C depict a control circuit for a security system, according to various embodiments of the present disclosure.
Figure 19B:
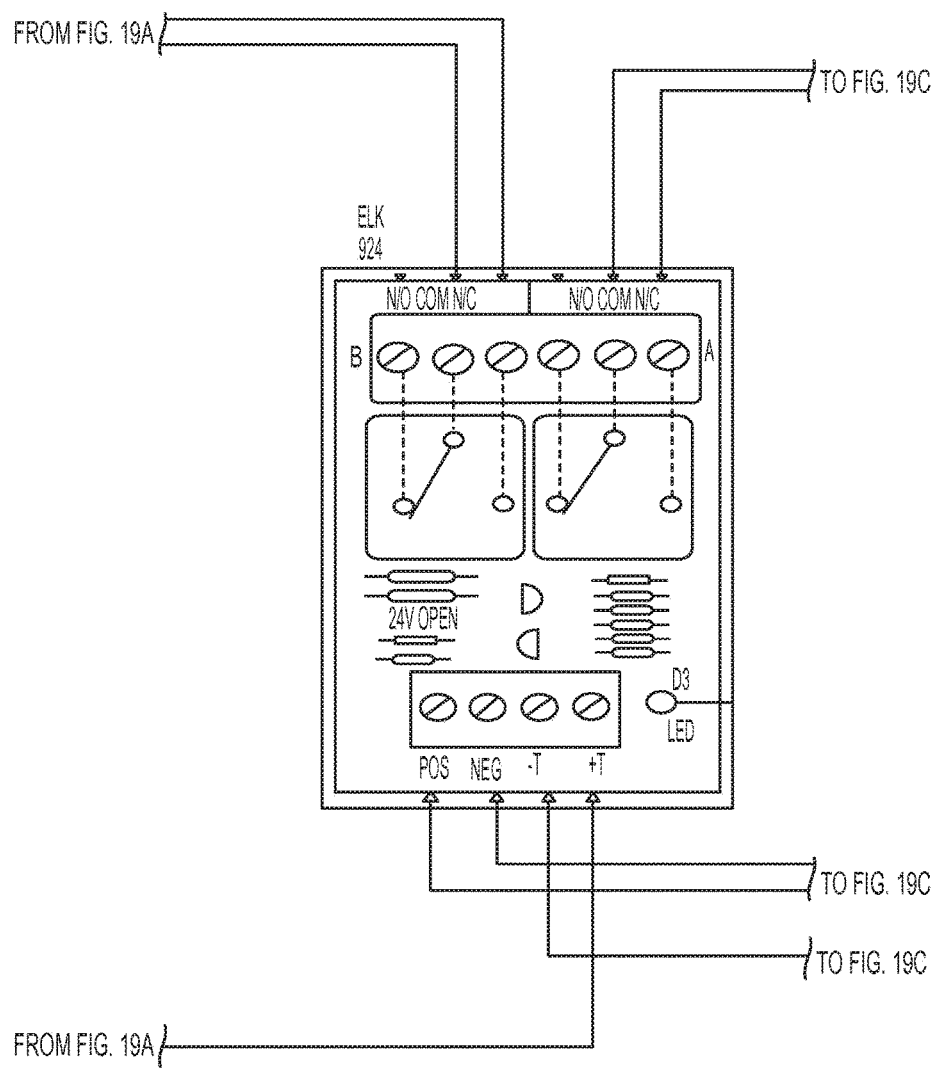
Figure 19C:
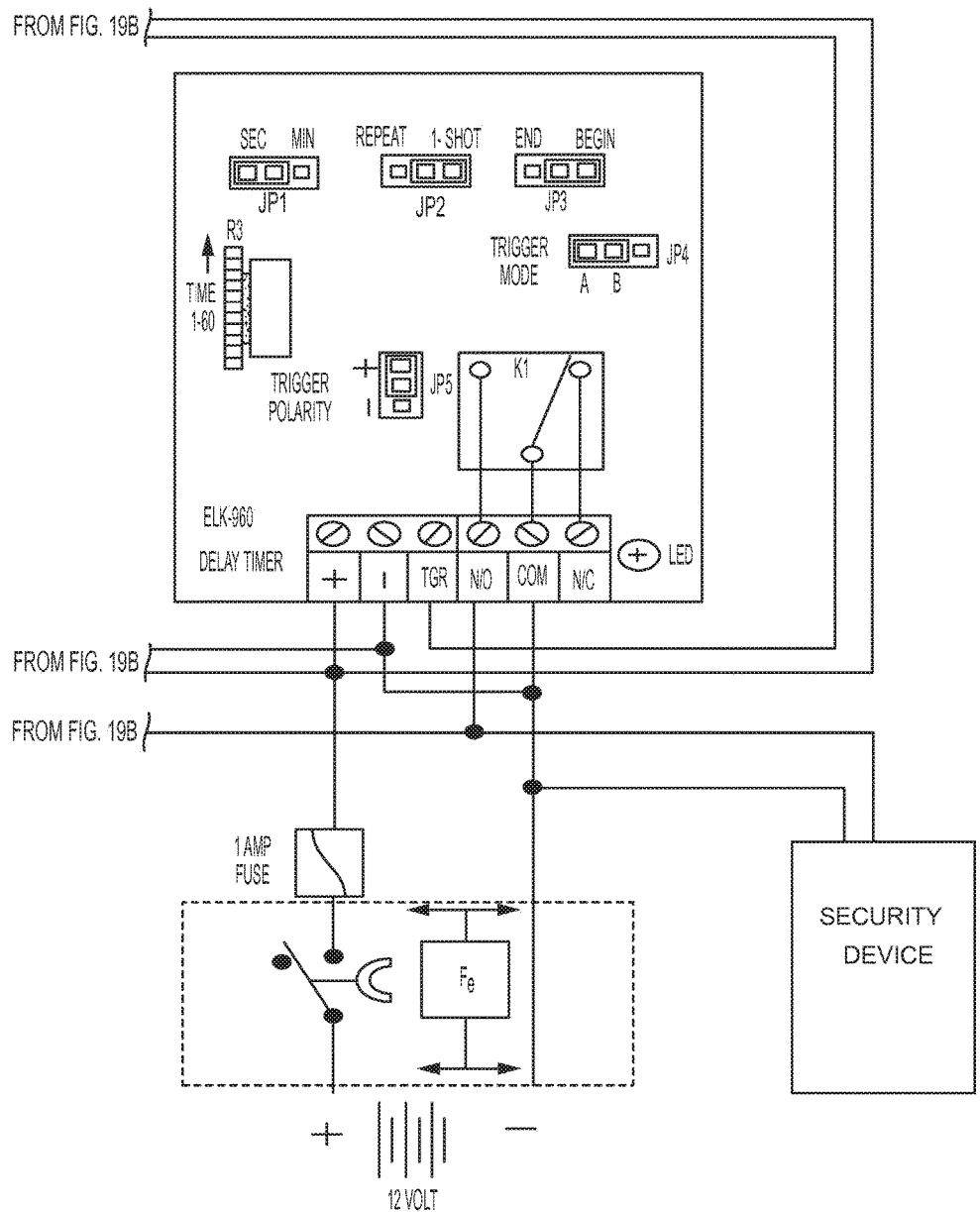

In use, when the motion detector 552 detects motion, the alarm system 560 and the supporting device(s) 558 can be powered on for a preset period of time via the relays 554 and 556. Additionally, each time the motion detector 552 detects motion while the alarm system 560 is powered on, the alarm system 560 can alarm. The alarm from the alarm system 560 can include lights, noises, cellular and/or wireless reporting, and/or additional security features described herein. FIGS. 19A-19C depict an exemplary control circuit for the security system schematically illustrated in FIG. 18. The control circuit can operably power a security device and may operably power supporting devices. Furthermore, the control circuit can be powered on by a magnetic door switch (FIG. 19C), as described in greater detail herein.

Figure 20:
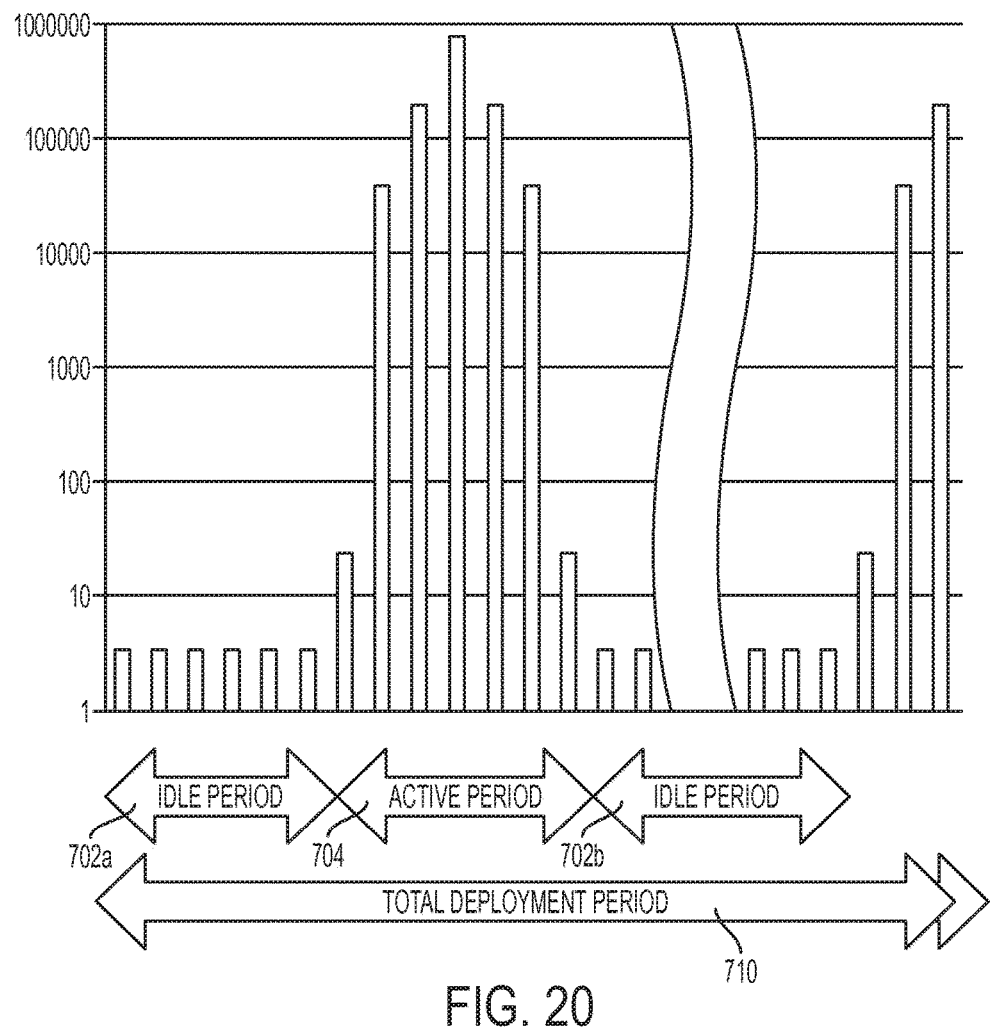
FIG. 20 is a graphical representation of the current draw of a security system during a deployment cycle, according to various embodiments of the present disclosure.

Referring now to FIG. 20, a graphic representation of current draw during a deployment cycle 710 of a security system is depicted. For a security system employing the control schematic of FIG. 18 and/or the control circuit of FIGS. 19A-19C, the security system is initially in an idle state, in which the current draw is low. For example, the current draw can be limited to the current necessary to power a passive infrared motion sensor. In such instances, the current draw can be less than 10 micro amps, for example. For example, the current draw can be approximately 3 to 5 micro amps when the security system is in the idle state. In other instances, the current draw can be greater than 10 mico amps when the security system is in the idle state. Comparatively, in the various security systems described herein employing a mechanical trigger line and/or a magnetic reed switch instead of a low current draw motion sensor, the power draw during the idle periods can be zero.

The security system can remain in the idle state, i.e., an initial idle period 702a, until active surveillance is appropriate. Active surveillance may be appropriate when motion is sensed by the motion sensor. When the motion sensor detects movement, an active period 704 of surveillance can be initiated. An active period can last several minutes. As long as the motion sensor continues to detect motion, the active period will be renewed. Accordingly, multiple active periods can occur back-to-back. The current scale in FIG. 20 is a logarithm scale. As depicted in FIG. 20, when the active period 704 is underway, the active surveillance features of the security system can draw significantly more current (orders of magnitude more current) than the passive infrared motion sensor draws during the idle periods 702a, 702b. For example, when in the active state, the security system can draw current between 0.1 and 1.0 amps when motion has been detected and the active period 704 is underway. When motion is no longer detected by the motion sensor, the security system can resume the idle state, i.e., another idle period 702b, until active surveillance is again appropriate.

The duty cycle of a security system can be the ratio of active periods, e.g., active surveillance, to the idle period(s) during the deployment cycle. An active period of the deployment cycle 710 can be less than 60 minutes. For example, each active period may be between 5 and 10 minutes. The idle periods of the deployment cycle 710 can be more than 60 minutes. For example, an idle period may be several days, weeks, or months. Accordingly, the duty cycle of the security system can be less than 10%. In certain instances, the duty cycle of a security system can be less than 1 and, in some instances, the duty cycle of a security system can be less than 0.01%, for example. In other instances, the duty cycle of a security system can be the ratio of active periods, e.g., active surveillance, to the length of the entire deployment.

The security systems disclosed herein are mountable to, in and/or on various mobile containers. For example, the security system 40 is mounted to the container 10 (FIG. 4), the security system 240 is mounted to the container 210 (FIG. 5), the security system 340 is mounted to the container 310 (FIGS. 9 and 10), and the security system 130 is mounted to the container 10 (FIG. 13). The various security systems can be adapted for use with various different containers. In other words, the security systems and containers mounted thereto can be interchangeable.

The security systems can be attached to the various containers without making permanent changes and/or modifications to the containers or to the security systems. In other words, a security system can be mounted and/or attached to a container without drilling holes in the container and without welding attachments to the container, for example. Moreover, the mount can provide a secure attachment which prevents the security system from moving and/or shifting during transit of the container. In various instances, when the security system is attached to a container, it can be difficult for unauthorized and/or uninformed people to remove or tamper with the security system due to a strong connection, such as a strong magnetic attraction. Special knowledge and/or techniques may be required to remove the security system from the container.

In various embodiments, a magnetic attraction can be used to secure a security system to a container. For example, the various security systems disclosed herein can include a magnetic attachment portion. Referring to FIG. 4, the enclosure 42 of the security system 40 includes the magnetic attachment portion 44. The magnetic attachment portion 44 is also depicted in the security system 70 (FIG. 11) and the security system 80 (FIG. 12). In certain instances, the magnetic attachment portion of a security system can be a switchable magnet, such as the switchable magnet 144 shown in FIG. 13. In other instances, the magnetic attachment portion can comprise permanent magnets, such as barium ferrite and/or rare earth magnets, for example. In instances where the container is comprised of a ferrous material, such as steel, for example, a magnetic attraction between the attachment portion on the enclosure of the security system and the container can attract the enclosure of the security system to the container.

In an exemplary embodiment, referring primarily to FIG. 4, the magnetic attachment portion 44 includes a magnet that is positioned within the enclosure 42. In other embodiments, the magnet can be mounted and/or otherwise fastened to the enclosure 42, for example. The magnet permits the enclosure 42 of the security system 40 to be secured to an inside wall of the container 10 without requiring permanent modifications to the container 10 or to the security system 40. For example, the container 10 comprises a ferrous material, such as steel, and the magnet can be magnetically attracted to the container 10 for secure attachment thereto. In various instances, the magnet can comprise a permanent magnet, such as barium ferrite or a rare earth magnet, for example, which can provide a secure attachment to the container 10. In certain instances, the magnetic attachment portion 44 can include a plurality of magnets.

In certain instances, the enclosure 42 can be positioned in a difficult-to-reach location inside the container 10 such that an intruder is further prevented and/or thwarted in attempts to reach the enclosure 42, overcome the magnetic attraction, and remove the enclosure 42 from the container 10, for example. In certain instances, the enclosure 42 can be mounted at a high position and/or the pathway to the enclosure 42 can be blocked and/or obstructed by cargo within the container 10, for example. Moreover, when the magnetic attachment portion 44 is secured within the housing or enclosure 42 of the security system 40 and/or integrally formed with the enclosure 42, an intruder cannot access the magnetic attachment portion 44 to remove the security system 40 from the shipping container 10 without first activating the security system 40.

In other instances, the magnet of the magnetic attachment portion 44 can be a switchable magnet, which can be positioned in the enclosure 42. A switchable magnet, or magnetic base, can include a permanent magnet that is configured to be reoriented and/or repositioned to switch the switchable magnet between an on position and an off position. For example, the switchable magnet can include a non-ferrous portion positioned between two ferrous, or substantially ferrous, portions, and a rotatable magnet that is positioned for rotatable contact with the non-ferrous portion and the ferrous, or substantially ferrous, portions. When the permanent magnet is rotated such that the poles thereof are embedded in the ferrous, or substantially ferrous, portions, the switchable magnet can be in the on position and the magnetic field can extend from the ferrous, or substantially ferrous, portions, which act as opposing poles. When the permanent magnet is rotated such that the poles thereof are embedded in the non-ferrous portion, the switchable magnet can be in the off position and the magnetic field generated by the switchable magnet can be minimized. The switchable magnet can permit the enclosure 42 of the security system 40 to be secured to an inside wall of the shipping container 10. Moreover, upon completion of a deployment cycle, the enclosure 42 can be unlocked and opened, and the switchable magnet 44 can be switched, to release the enclosure 42 from the shipping container 10, for example.

In certain instances, a container may not include a magnetic attachment portion. For example, the container may not comprise ferrous material or may comprise insufficient ferrous material to generate a magnetic attraction. Additionally or alternatively, the container may be of insufficient cross-section, e.g., too thin, such that a magnetic attachment portion of a security system, such as the portion 44 (FIGS. 4, 11, and 12) or 144 (FIG. 13), for example, is insufficiently attracted to the container. In such instances, referring now to FIG. 13, a magnetic mat 14 can be applied to the container 10 to generate sufficient magnetic attraction through the wall of the container 10. The magnetic mat 14 can be comprised of a ferrous material, for example. In certain instances, the magnetic mat 14 can be a magnetic base or clamp block. For example, the magnetic mat 14 can be switchable between an on position and an off position. The magnetic mat 14 can be positioned on an outside wall, surface and/or side of the shipping container 10. In certain instances, the magnetic mat 14 can be approximately 0.5 inch (12 mm) thick, for example, and can be attracted to the magnetic attachment portion (e.g., portion 44 or portion 144) of a security system enclosure through the wall of the container 10.

Referring still to FIG. 13, the magnetic attachment portion 144 can be a switchable magnet, which is attracted to the magnetic mat 14 when the switchable magnet is switched "on" inside the shipping container 10. In various instances, the magnetic attachment portion 144 can be attracted to the magnetic mat 14 when both the magnetic attachment portion 144 and the magnetic mat are switched on. In certain instances, the magnetic attachment portion 144 can include a permanent magnet. The magnetic attraction between the enclosure 131 and the container 10 can "clamp" the enclosure 131 of the security system 130 to the container 10 wall without permanently modifying the container 10 or the enclosure 131 of the security system 130. The magnetic mat 14 can be positioned on any suitable side, top and/or bottom of the shipping container 10 and/or multiple magnetic mats 14 can be positioned relative to the container 10. The magnetic attraction between the magnetic mat 14 and the magnet 144 can permit the security system 130 to be attached and unattached to a variety of different types of containers, for example.

In certain instances, when a container is insufficiently ferrous to securely attach a security system enclosure via a magnet, a magnetic mat or clamp block can be positioned on the outside of the container. A magnetic field generated by the magnet within the container, such as a magnetic portion of a security system enclosure and/or an internal magnetic mat, for example, can be attracted to the magnetic mat or clamp block on the outside of the container through the container wall. Such a magnetic attraction through the container wall secures the security system enclosure to the container.

Figure 5:
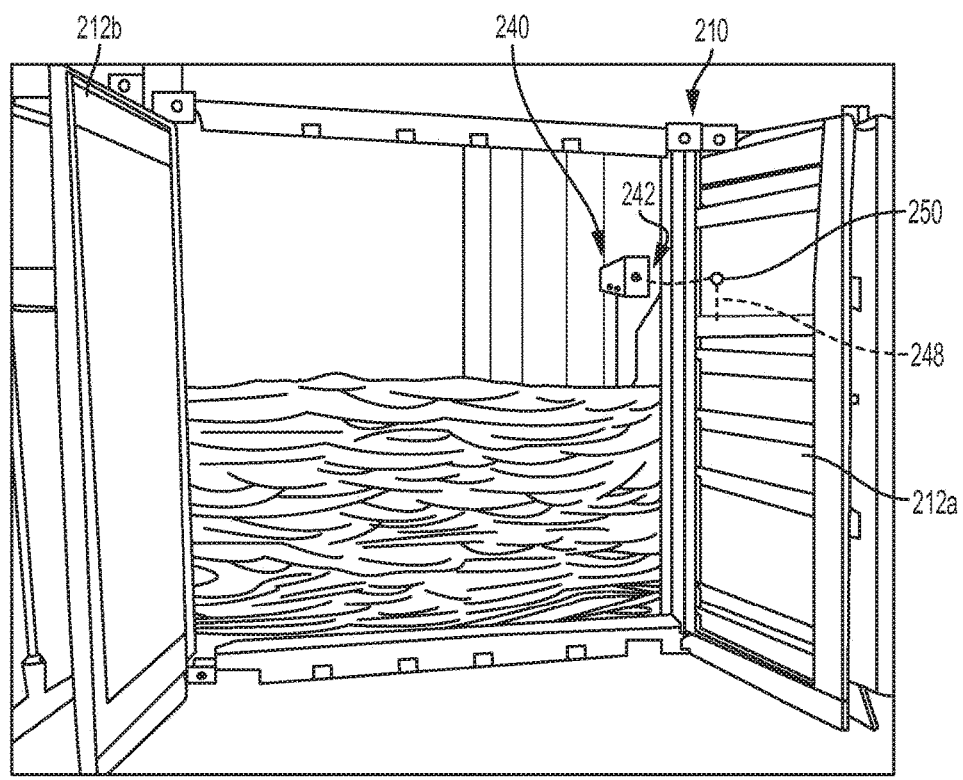
FIG. 5 is a perspective view of a loaded shipping container having a pair of doors, and further depicting a security system positioned within the shipping container and a trigger line extending between the security system and one of the doors, according to various embodiments of the present disclosure.
Figure 6:
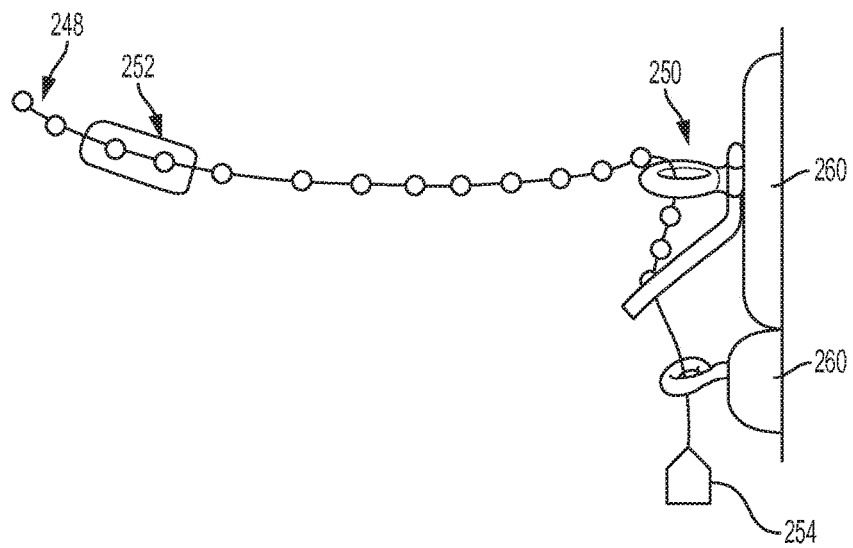
FIG. 6 is an elevation view of a catching device and the trigger line of FIG. 5 extending through the catching device, according to various embodiments of the present disclosure.
Figure 7:
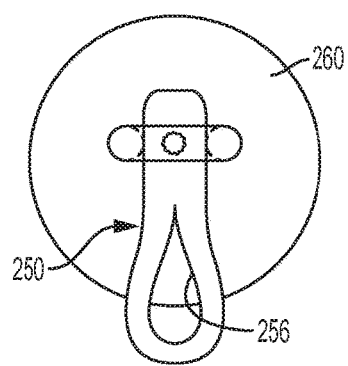
FIG. 7 is elevation view of the catching device of FIG. 6.
Figure 8:
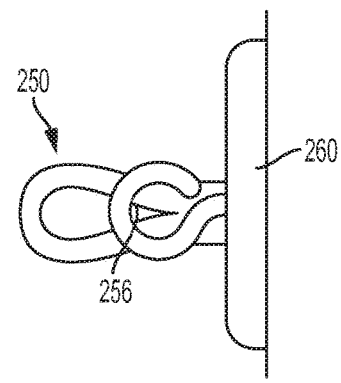
FIG. 8 is a plan view of the catching device of FIG. 6.
Figure 21:
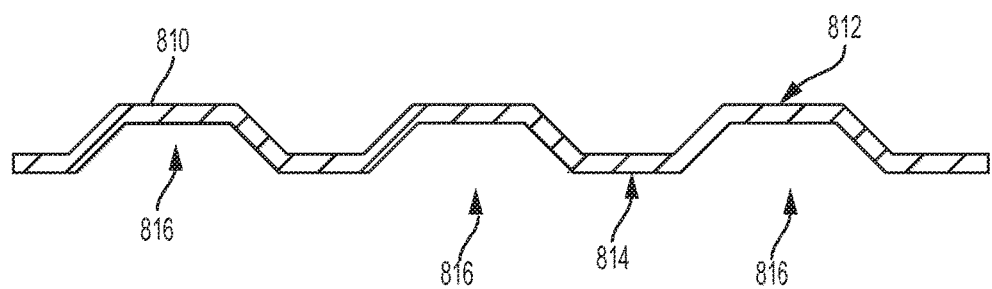
FIG. 21 is a cross-sectional top view of a container wall, according to various embodiments of the present disclosure.

In certain instances, referring now to FIG. 21, the walls of a container 810 can include channels and/or beveled surfaces, for example (see also FIGS. 5, 9 and 10). The enclosure of a security system can be positioned against an interior surface 812 of the container 810, and a magnetic mat, such as the mat 14 (FIG. 9), for example, can be positioned against an exterior surface 814 of the container 810. In certain instances, the magnetic mat 14 can be positioned within a channel 816, such that the magnetic mat 14 does not protrude beyond the outside perimeter of the container 810. In such instances, if the container 810 is tightly and/or closely packed during transit, the magnetic mat 14 on the outside of the container 810 can avoid interference with other containers and/or structures around the container 810.

In certain instances, the various security systems described herein may be mounted to an uneven or irregular container surface. For example, the mounting surface of a container may include scaling paint, rust, mill scale, uneven welds, and/or misaligned structural members. Additionally or alternatively, the mounting surface of the container can be rough and/or may include beveled surfaces. To accommodate such surface variations of the mounting surface, a magnetic mat can be positioned between the security system enclosure and the mounting surface of the container. In certain instances, the magnetic mat can be adaptable to the mounting surface, and can assume a flexible orientation based on the irregularities of the mounting surface. In various instances, the magnetic mat can include a piece of fabric having a plurality of receptacles for receiving magnets. The fabric and magnets can form a flexible magnetic quilt, for example.

Figure 23:
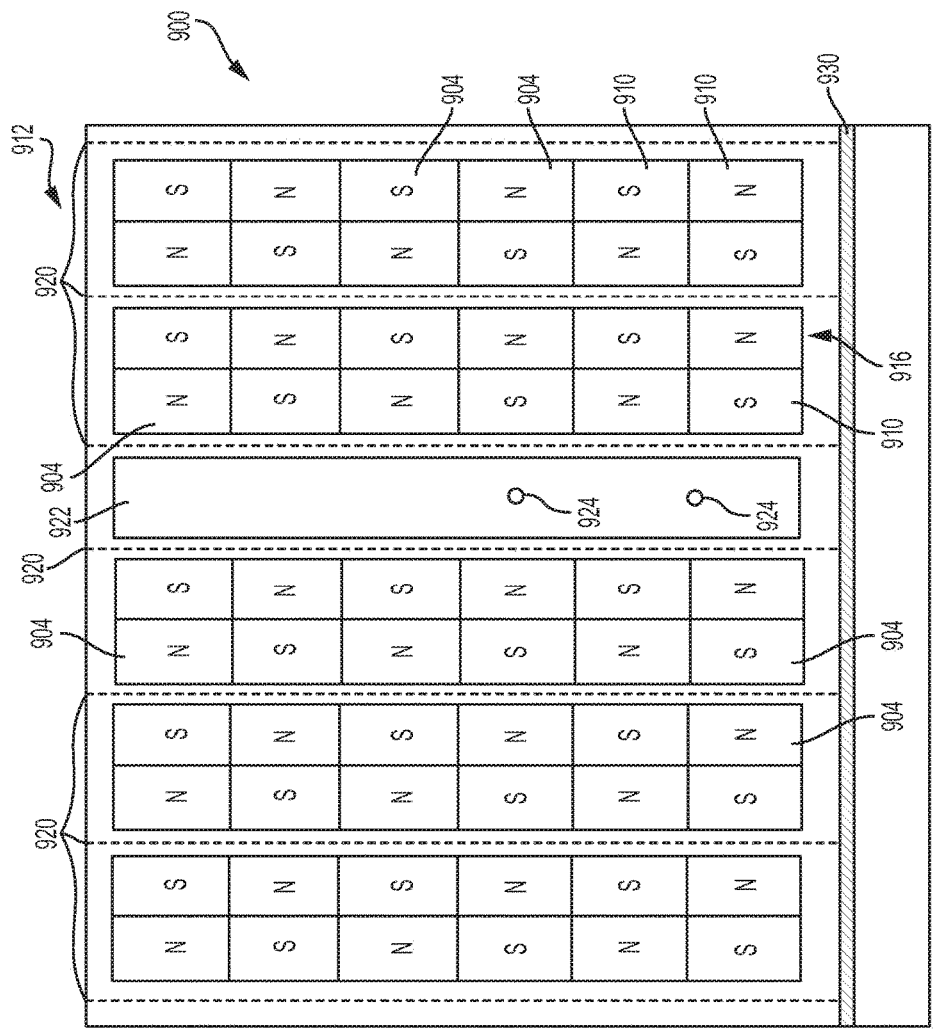
FIG. 23 is an elevation view of the magnetic mat of FIG. 22.
Figure 22:
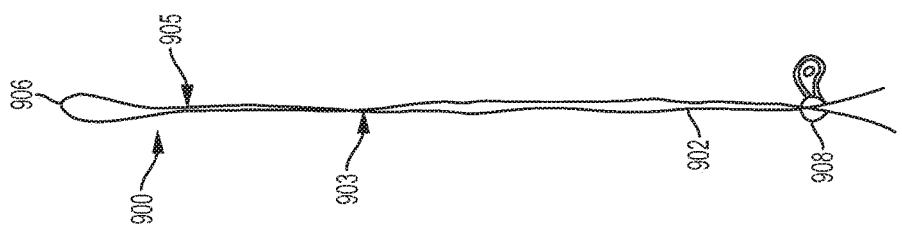
FIG. 22 is a plan view of a magnetic mat for attaching a security system to a container, according to various embodiments of the present disclosure.
Figure 24:
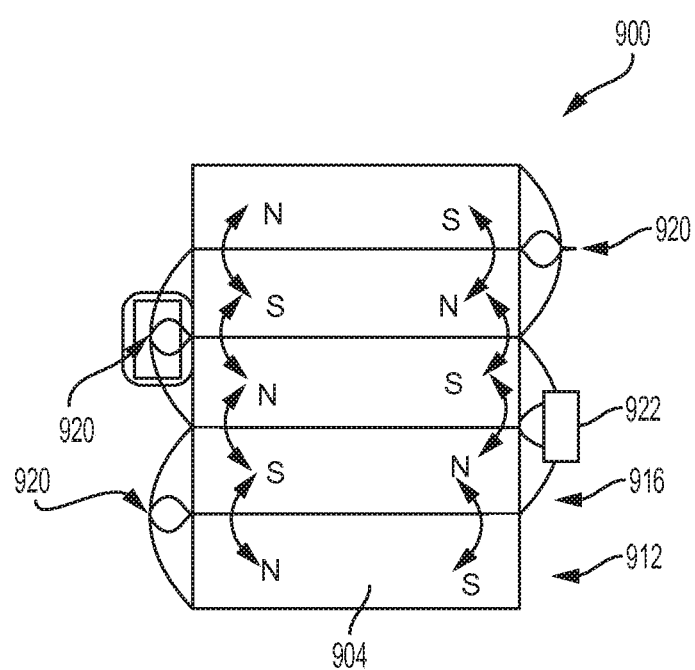
FIG. 24 is an elevation view of the magnetic mat of FIG. 22, depicting the magnetic mat in a folded orientation.

Referring now to FIGS. 22-24, a magnetic mat 900 is depicted. The magnetic mat 900 includes a piece of fabric 902 and an array of receptacles 904 (FIG. 23). Each receptacle 904 is configured to receive at least one magnet 910 therein. Accordingly, the magnetic mat 900 includes an array of magnets 910 retained within the fabric 902. In certain instances, the array of receptacles 904 can be a single column of receptacles 904 housing a single column of magnets 910. In other instances, the array of receptacles 904 can include a plurality of columns of receptacles 904 and/or a plurality of columns of magnets 910 housed therein. In certain instances, the magnets 910 can be permanent magnets. For example, the magnets 910 can include a ferrous material. In at least one embodiment, the magnets can be comprised of barium ferrite. In certain instances, at least one magnet in the array of magnets can be a rare earth magnet.

The magnets 910 can be loosely retained within the receptacles 904. In such instances, the fabric 902 can shift and/or bend between the magnets 910 to alter the relative orientations of the magnets 910. The flexibility of the mat 900 can allow the quilt to accommodate to a rough and/or uneven attachment surface on a container wall. In other words, when positioned on the attachment surface of the container, the mat 900 can self-align and conform to any surface irregularities. In such instances, the holding force of the magnets 910 can be maximized. The magnets 910 can be relatively thin, such that the thickness of the mat 900 is minimized. In certain instances, the mat 900 can be less than 10 mm thick. In other instances, the mat 900 can be less than 5 mm thick. Accordingly, the mat 900 can be unobtrusive to the mounting surface(s) to which it is attached.

In certain instances, the magnetic mat 900 can also include a metal bar or mounting bracket 922. The mounting bracket 922 can be positioned between a first side 903 (FIG. 22) and a second side 905 (FIG. 22) of the mat 900. In other instances, the mounting bracket 922 can be secured to either side 903, 905 of the mat 900. In various instances, the mounting bracket 922 can include a ferrous material to facilitate attachment of the magnetic mat 900 to the security system enclosure and/or to the container. Moreover, the mounting bracket 922 can include tapped holes 924, which can be dimensioned and structured to receive fasteners. The fasteners can extend between the mounting bracket 922 and the security system enclosure to secure the magnetic mat 900 to the enclosure. In certain instances, the magnetic mat 900 can also include a thin gauge sheet of metal. Such a metal sheet can be positioned between the magnets and the enclosure of a security system, and may control the stray magnetic field and/or provide mechanical stability.

Referring primarily to FIG. 22, the piece of fabric 902 can be folded at a fold 906, such that the fabric 902 forms the first side 903 and the second side 905 of the magnetic mat 900. In other instances, two pieces of fabric 902 can be sewn or otherwise fastened together to form the first side 903 and the second side 905 of the magnetic mat 900. The receptacles 904 can be defined between the first side 903 and the second side 905 of the magnetic mat 900. Stitching and/or other fasteners between the layers of fabric 902 can define at least a portion of the boundary of the receptacles 904. In certain instances, the magnetic mat 900 can also include a zipper 908, which can facilitate removal and/or replacement of the magnets 910 positioned within the receptacles 904. For example, magnets 910 can be inserted along the opening 930 (FIG. 23) when the zipper 908 is unzipped. In certain instances, each receptacle 904 may not receive a magnet and/or at least one receptacle 904 can receive a different type of magnet depending on the application and required magnetic strength of the magnetic mat 900.

Referring to the two-dimensional array of receptacles 904 shown in FIG. 23, a two-dimensional array of magnets 910 are arranged along the array of receptacles 904. The magnets 910 are permanent magnets. Moreover, the permanent magnets 910 are arranged in a checkerboard pattern of alternating polarity along the two-dimensional array of receptacles 904. In other words, each magnet to the side, top, and bottom is of an opposite polarity. The foregoing arrangement can generate a strong magnetic field in the magnetic mat 900. Referring still to FIG. 23, the two-dimensional array of receptacles 904 includes a plurality of columns. For example, the receptacles 904 are arranged in a first column 912 and a second column 916. Columns of stitches 920 can be positioned between adjacent columns 912, 916 of receptacles 904. For example, a column of stitches 920 is positioned between the first column 912 and the second column 916. In some instances, rows of stitching can also traverse the columns of receptacles 904 to define rows of receptacles 904, as well. In various instances, the column of stitches 920 can form a threaded fastener between the columns of receptacles 904. Additionally or alternatively, other fasteners can extend between the columns of receptacles 904 to at least partially define the boundary of the receptacles 904. For example, the fabric 902 can be fastened together by welding, adhesives, and/or other mechanical fasteners, such as rivets.

In certain instances, such as when shipping and/or transporting the magnetic mat 900, it can be desirable to fold the magnetic mat 900 to shunt the magnetic field from the magnets 900. For example, the magnetic field in the mat 900 can be canceled out, or substantially canceled out, when the mat 900 is folded in a predefined way. Referring primarily now to FIG. 24, when the magnetic mat 900 is folded along the columns of stitches 920, the magnetic field of the magnets 910 in the adjacent columns of receptacles 904 is substantially shunted. For example, the magnets 910 can be stacked head-to-tail such that the north pole of each magnet is next to the south pole of an adjacent magnet. Accordingly, the folded mat 900 can be shipped by courier service because the magnetic field has been shunted, which is required by many shipper and/or courier services.

In various instances, at least a portion of the fabric 902 can be coated with a material having a greater coefficient of friction than the fabric 902. For example, the fabric 902 can be comprised of a NYLON™ material, and the coating can be comprised of a silicone material. Because the coefficient of friction of the coating relative to the container is greater than a coefficient of friction of the fabric 902 relative to the container, the coating can further reduce slippage of the security system enclosure relative to the mounting surface of the container.

In instances where the container does not include a magnetic mounting surface, a second magnetic mat can be positioned on the outside of the container. For example, if the container is non-ferrous and/or not comprised of sufficient ferrous material and/or is of insufficient cross-section to attract a magnetic attachment portion and/or first magnetic mat, an additional magnetic mat can be used. Similar to the magnetic mat 14 (FIG. 13), the magnetic attraction between the pair of magnetic mats 900 positioned on either side of the container wall can secure the magnetic mats 900 in place on the container wall.

The magnetic mat(s) 900 can be removed from the mounting surface(s) with the strategic application of simple hand tools and common items, such as cardboard, for example. In various instances, instructions can be provided for the removal of the magnetic mat(s) from the mounting surface(s). The instructions can include a series of steps. For example, first, a corner of the magnetic mat 900 can be peeled away from the mounting surface with a screwdriver-type tool. A piece of cardboard can then be inserted between the magnetic mat 900 and the mounting surface at the peeled-away corner. As the cardboard is progressively pushed between the magnetic mat 900 and the mounting surface, the magnetic mat 900 can be removed from the mounting surface. Brute force may be ineffective at removing the magnetic mat 900 from the mounting surface.

As described herein, security systems according to the foregoing embodiments can include a range of surveillance and/or communication equipment. For example, certain lower cost security systems can include basic components, and can be mostly deterrent in nature. In other embodiments, the security systems can include the basic components and may also include additional elements and/or features, such as linking with the internet, live uploading capabilities, and live downloading of verbal commands by security monitoring staff, for example. The reader will appreciate the range of surveillance and/or communication equipment and features that can be employed in the security systems described herein. Moreover, the range of functionality of the security system may not be evident by causal observation and/or may be intentionally misleading. As a result, the greatest deterrent effect can be achieved at the least average cost of deployment.

Figure 25:
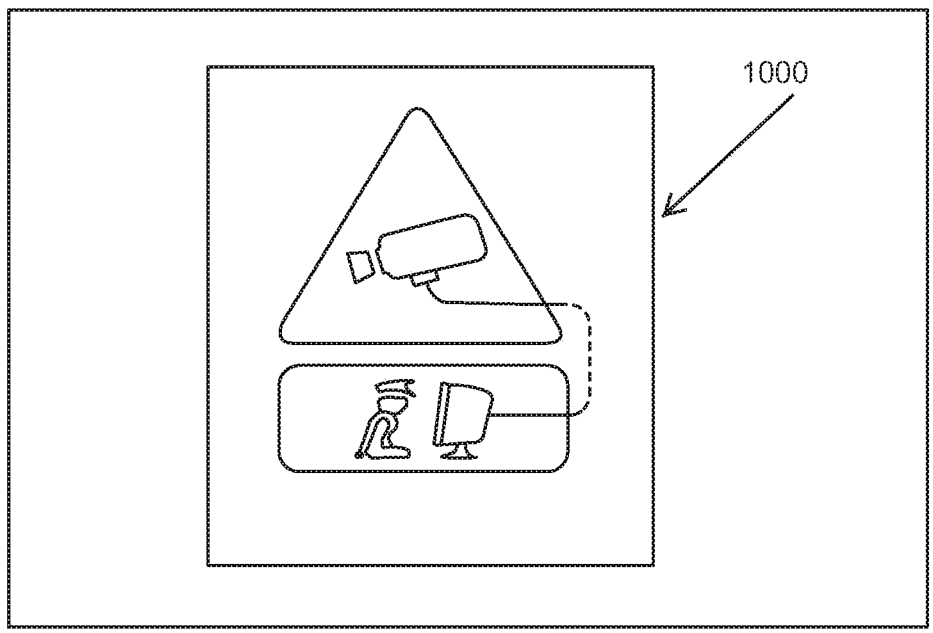
FIG. 25 is an elevation view of an iconic sign for use with a security system, according to various embodiments of the present disclosure.

The security systems described herein can include an obvious monitor, signage and/or display to alert intruders and intended thieves that they are being observed and/or recorded by the security system. In certain embodiments, the security system can include additional inside and/or outside signage that reinforces the security measures provided by the security system. In various embodiments, the signage can be "iconic" such that a viewer can appreciate and/or understand the signage regardless of the language(s) known by the viewer. An exemplary iconic sign 1000 is depicted in FIG. 25. In certain instances, signage can be included on and/or within the shipping container though all and/or some of the security features may not be activated and/or available. This may further deter thefts and can minimize the costs. In some instances, a security system can include signage outside of the shipping container. In other instances, the security system may not include outside signage. For example, signage outside of the container can be elective. Outside signage may be advised when the shipping container is passing through regions where theft is likely. However, in various instances, outside signage may be excluded from the security system when such signage would highlight the value of the cargo, and thus, encourage the theft thereof.

In various instances, the security systems described herein can be deployed in a stealth and/or partially stealth mode, such that the true scope of the security system is not revealed to a potential intruder. For example, the security system may only reveal various deterrent security measures while concealing other security measures, such as communication with a remote monitoring site and/or law enforcement personnel, for example. Moreover, in certain instances, the security system can be deployed in a primarily deterrent mode, such that signage, false or dummy cameras, audio beeps and/or other sounds are presented to an intruder with the purpose of confusing and/or deterring the intruders despite the lack of "real" surveillance equipment, for example.

Figure 26:
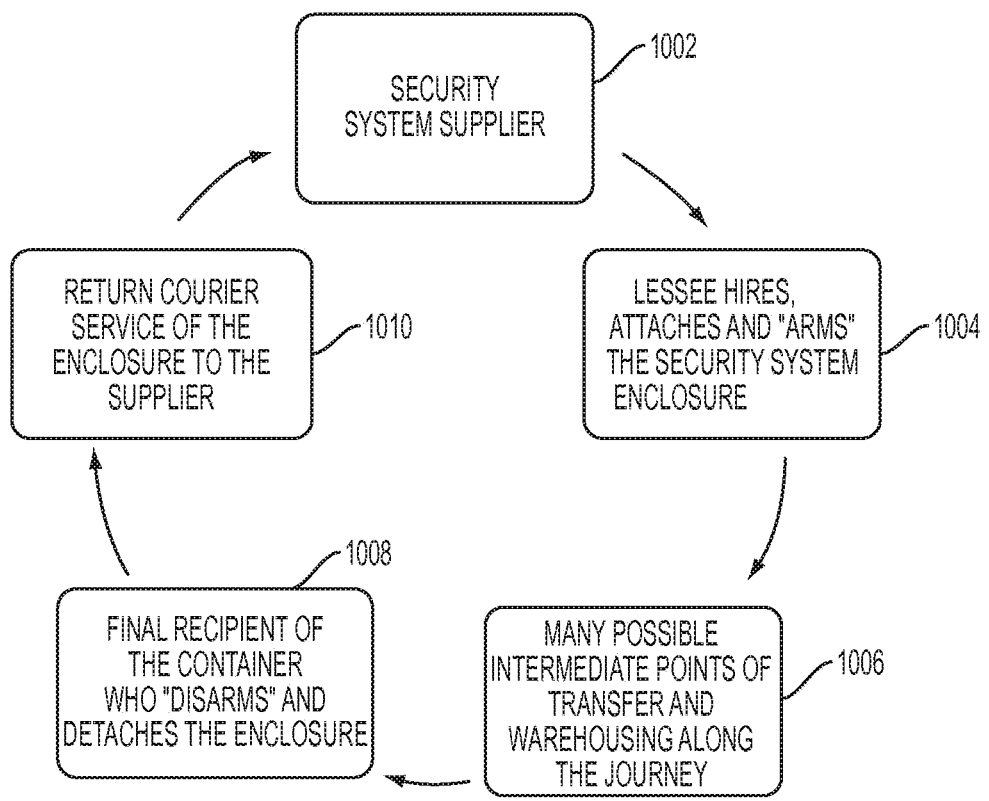
FIG. 26 is a diagram depicting a deployment cycle of a security system, according to various embodiments of the present disclosure.

An exemplary deployment cycle for the security systems disclosed herein is depicted in FIG. 26. For example, the security system can be leased by importers or exporters for at least one deployment cycle, for example, and may then be returned to the security system owner for a subsequent deployment to a different lessee. Referring to the deployment cycle shown in FIG. 26, the security system can begin the deployment cycle in the control of the security system supplier at step 1002. Thereafter, at step 1004, the exporter or importer can obtain the security system for a period of time. For example, the exporter or importer can lease the security system for use between loading of the goods by the exporter, for example, and unloading of the goods by the importer, for example. At step 1006, the security system can travel through a transit route with a container from an initial, loading location to a final, unloading location and/or a temporary storage location. Upon completion of the transit route, the security system can be disarmed and removed from the shipping container at step 1008 by the final recipient of the container. The security system can then be returned to the security system supplier at step 1010, for example. The security system may be returned by return courier service, for example. In this way, security is obtained even for "inside jobs", i.e., wherein personnel associated with the shipper and/or receiver of the cargo is the intruder or culprit.

During the deployment cycle, active surveillance can be triggered, as described in greater detail herein, at step 1006, i.e., at one or more transfer points along the transit route of the shipping container. In other instances, active surveillance may be triggered at step 1004 and/or step 1008, for example, if the attempted theft is an "inside" job. In certain instances, upon completion of a transit route, the security system can be redeployed for a subsequent deployment. In certain instances, the security device can be returned to the original supplier for the subsequent deployment at step 1010, can be leased for a subsequent deployment at step 1002, and/or can be attached to a different container for the subsequent deployment at step 1004. The reader will appreciate that reuse and/or redeployment of the security system can provide an economically effective solution for importers and/or exporters to cargo theft.

The reader will further appreciate that the security system can be employed for a plurality of deployment cycles and can be adapted for use with various containers, deployment durations, and deployment locations. For example, the security system can be leased to individuals and/or companies for short-term and/or long-term storage spaces, such as PODS® and/or trailers, for example, which may be stored in warehouses, parking lots, along streets, and/or in empty fields, for example. The security system enclosure can be mounted and/or attached to the various containers without modifying the security system or the container. Additionally, the security system can be removed and/or detached from the various containers without modifying the security system or the container. In certain instances, the security systems can be secured to the containers via a magnetic attraction between the security system enclosure, the container, and one or more magnetic mats, as described in greater detail herein.

Between deployment cycles, the security system can be readied for the subsequent deployment cycle. For example, the security system can be inspected between deployment cycles. Additionally or alternatively, any internally-stored data can be transferred from the security system and/or deleted from the security system between deployment cycles. Additionally or alternatively, the batteries of the security system can be recharged and/or replaced between deployment cycles.

The reader will appreciate that the various processors, or processing units, described herein may be implemented as a host central processing unit (CPU) using any suitable processor circuit or logic device (circuit), such as a general purpose processor. The processing unit also may be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

Additionally, some embodiments may be illustrated and described herein as comprising functional components, software, engines, and/or modules for performing various operations, it can be appreciated that such components or modules may be implemented by one or more hardware components, software components, and/or combination thereof. The functional components, software, engines, and/or modules may be implemented, for example, by logic (e.g., instructions, data, and/or code) to be executed by a logic device (e.g., a processor). Such logic may be stored internally or externally to a logic device on one or more types of computer-readable storage media. In other embodiments, the functional components such as software, engines, and/or modules may be implemented by hardware elements that may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and illustrative. Variations and changes thereto may be made without departing from the scope of the claims. For example, the features illustrated or described in connection with one exemplary embodiment may be combined with the features of at least one other embodiment. Such modifications and variations are intended to be included within the scope of the present disclosure. This application is therefore intended to cover any variations, uses, or adaptations of the disclosed embodiments using its general principles. Further, this application is intended to cover such departures from the present disclosure as come within known or customary practice in the relevant art.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements, but is not limited to possessing only those one or more elements. Likewise, an element of a system, device, assembly, or apparatus that "comprises," "has," "includes" or "contains" one or more features possesses those one or more features, but is not limited to possessing only those one or more features.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A security system for a mobile, unpowered container having an interior wall and a door movable between an open orientation and a closed orientation, wherein the security system comprises:
    an enclosure comprising a mounting portion, wherein the mounting portion is releasably mountable to the interior wall of the container;
    a switch positioned within the enclosure, wherein the switch is movable between a closed configuration and an open configuration upon movement of the door between the open orientation and the closed orientation;
    a battery pack positioned within the enclosure, wherein the battery pack is in communication with the switch; and
    a security device positioned within the enclosure, wherein the switch is positioned intermediate the battery pack and the security device, and wherein the security device comprises:
    an alarm; and
    a recording device positioned to record activity within the container, wherein the security device is in a power-save mode when the switch is in the open configuration, and wherein the battery pack is configured to operably power the security device in a higher power mode when the switch is in the closed configuration.

2. The security system of claim 1, wherein the switch comprises a normally-open relay, and wherein the security system further comprises:
    a motion sensor in communication with the normally-open relay, wherein the motion sensor comprises a passive infrared motion sensor; and a secondary battery configured to operably power the motion sensor, wherein the normally-open relay is movable from the normally-open position when the motion sensor detects motion.

3. The security system of claim 1, further comprising a trigger line extending between the door and the switch in the enclosure.

4. The security system of claim 3, wherein the trigger line extends through a catching aperture mounted to the door.

5. The security system of claim 1, wherein the switch comprises a reed switch configured to detect a change in magnetic field when the door of the container is moved between the open orientation and the closed orientation.

6. The security system of claim 1, wherein the alarm comprises at least one of a speaker and a light, wherein the recording device comprises at least one of an audio recording device, a video recording device, and a camera, and wherein the security system further comprises a data storage device and a wireless transmitter.

7. A security system for a mobile, unpowered container having a door movable between an open orientation and a closed orientation, wherein the security system comprises:
   an enclosure;
   a switch positioned within the enclosure, wherein the switch is movable between a closed configuration and an open configuration upon movement of the door between the open orientation and the closed orientation;
   a battery pack positioned within the enclosure, wherein the battery pack is in communication with the switch;
   a security device positioned within the enclosure, wherein the security device comprises:
      an alarm; and
      a recording device, wherein the battery pack is configured to operably power the security device when the switch is in the closed configuration; and
   a magnetic mat removably positionable intermediate a magnetic portion of the enclosure and a magnetic portion of the container, wherein a magnetic attraction between the magnetic mat, the magnetic portion of the enclosure, and the magnetic portion of the container attracts the enclosure to the container when the magnetic mat is positioned intermediate the magnetic portion of the enclosure and the magnetic portion of the container.

8. A security system for a mobile, unpowered container having a door movable between an open orientation and a closed orientation, wherein the security system comprises:
   an enclosure;
   a switch positioned within the enclosure, wherein the switch is movable between a closed configuration and an open configuration upon movement of the door between the open orientation and the closed orientation;
   a battery pack positioned within the enclosure, wherein the battery pack is in communication with the switch;
   a security device positioned within the enclosure, wherein the security device comprises:
      an alarm; and
      a recording device, wherein the battery pack is configured to operably power the security device when the switch is in the closed configuration; and
   a first magnetic mat removably positionable intermediate the enclosure and an interior wall of the container;
   a second magnetic mat removably positionable adjacent to an exterior wall of the container;
   wherein a magnetic attraction between the first magnetic mat and the second magnetic mat attracts the enclosure to the container when the first magnetic mat is positioned intermediate the enclosure and the interior wall of the container and the second magnetic mat is positioned adjacent to the exterior wall of the container.

9. A method, comprising:
   providing a security system for a deployment, wherein the deployment comprises monitoring a mobile, unpowered container, wherein the mobile, unpowered container comprises an interior wall and a door movable between an open orientation and a closed orientation, and wherein the security system comprises:
      an enclosure; and
      a battery pack for powering the security system, wherein the battery pack is positioned within the enclosure;
      a switch positioned within the enclosure, wherein the switch is movable between a closed configuration and an open configuration upon movement of the door between the open orientation and the closed orientation, wherein the battery pack is in communication with the switch;
      a security device positioned within the enclosure, wherein the security device comprises an alarm and a recording device positioned to record activity within the container, wherein the battery pack is configured to operably power the security device when the switch is in the closed configuration;
      a processor in signal communication with a remote monitoring location; and
      a data storage device in signal communication with the processor, wherein the data storage device is configured to store a plurality of security breach data;
   installing the enclosure on the interior wall of the container;
   automatically transmitting the plurality of security breach data from the data storage device to the remote monitoring location at one or more predefined times during the deployment; and
   receiving the security system after the deployment.

10. The method of claim 9, wherein the deployment comprises a first deployment and the mobile, unpowered container comprises a first mobile, unpowered container, and wherein the method further comprises:
   providing a security system for a subsequent deployment, wherein the subsequent deployment comprises monitoring a second mobile, unpowered container; and
   receiving the security system after the subsequent deployment.

11. The method of claim 10, wherein using the security system comprises:
   providing instructions for attaching the security system to an inside surface of the first mobile, unpowered container without modifying the security system or the first mobile, unpowered container; and
   providing instructions for detaching the security system from the inside surface of the first mobile, unpowered container without modifying the security system or the first mobile, unpowered container.

12. The method of claim 10, further comprising:
   inspecting the security system after the first deployment and before the subsequent deployment; and
   securing, archiving, and subsequently deleting internally-stored data from the security system after the first deployment and before the subsequent deployment.

* * * * *